United States Patent
Konda et al.

(10) Patent No.: US 12,118,074 B2
(45) Date of Patent: Oct. 15, 2024

(54) METHODS AND APPARATUS TO GENERATE DYNAMIC PASSWORD UPDATE NOTIFICATIONS

(71) Applicant: MCAFEE, LLC, San Jose, CA (US)

(72) Inventors: Tirumaleswar Reddy Konda, Karnataka (IN); Shashank Jain, Bengaluru (IN); Devanshi Saxena, Uttar Pradesh (IN)

(73) Assignee: McAfee, LLC, San Jose, CA (US)

( * ) Notice: Subject to any disclaimer, the term of this patent is extended or adjusted under 35 U.S.C. 154(b) by 367 days.

(21) Appl. No.: 17/539,167

(22) Filed: Nov. 30, 2021

(65) Prior Publication Data
US 2023/0169161 A1    Jun. 1, 2023

(51) Int. Cl.
*G06F 21/57*  (2013.01)
*G06F 21/46*  (2013.01)

(52) U.S. Cl.
CPC ............ *G06F 21/46* (2013.01); *G06F 21/577* (2013.01)

(58) Field of Classification Search
CPC ..... H04L 9/3226; G06F 21/46; G06F 21/577; G06F 21/45; H04W 12/068
USPC ......................................................... 726/26
See application file for complete search history.

(56) References Cited

U.S. PATENT DOCUMENTS

| | | | |
|---|---|---|---|
| 8,055,904 B1* | 11/2011 | Cato | G06F 21/554 705/72 |
| 8,959,618 B2 | 2/2015 | Schneider | |
| 9,396,324 B1* | 7/2016 | Gariepy | H04L 63/0846 |
| 2002/0115425 A1* | 8/2002 | Carter | H04M 1/724 455/410 |
| 2013/0239203 A1* | 9/2013 | Otsuka | G06F 21/45 726/18 |
| 2018/0359272 A1* | 12/2018 | Mizrachi | H04L 67/535 |
| 2020/0076814 A1* | 3/2020 | Cohen | H04L 63/08 |
| 2021/0312077 A1 | 10/2021 | Jain et al. | |
| 2022/0060509 A1* | 2/2022 | Crabtree | H04L 63/1441 |
| 2022/0070000 A1* | 3/2022 | Gondza | H04L 63/123 |

OTHER PUBLICATIONS

CyberExperts, "The Security Downside of SMS-based Multi Factor Authentication (MFA)", George Mutune, CyberExperts, 2021 (retrieved from: https://cyberexperts.com/the-security-downside-of-sms-based-multi-factor-authentication-mfa/ Nov. 16, 2021), 2 pages.

(Continued)

*Primary Examiner* — Meng Vang
(74) *Attorney, Agent, or Firm* — HANLEY, FLIGHT & ZIMMERMAN, LLC

(57) ABSTRACT

Methods, apparatus, systems, and articles of manufacture are disclosed that determine a dynamic password update notification interval based on a breach risk classification and an automatic password update mechanism of an online service with which a user has an account. The disclosed methods, apparatus, systems, and articles of manufacture generate a password update suggestion and/or an automatic password update for the user at the dynamic password update notification interval determined by the processor circuitry.

20 Claims, 10 Drawing Sheets

(56) References Cited

OTHER PUBLICATIONS

Datatracker, "Hypertex Transfer Protocol (HTTP/1.1): Authentication" rfc7235, R. Fielding, Ed., Internet Engineering Task Force (IETF), Jun. 2014 (retrieved from https://datatracker.ietf.org/doc/html/rfc7235) Nov. 16, 2021, 19 pages.
Datatracker, 'The 'Basic' HTTP Authentication Scheme, rfc7617, J Reschke, Internet Engineering Task Force (IETF), Sep. 2015 (retrieved from https://datatracker.ietf.org/doc/html/rfc7617), 15 pages.
Datatracker, "Salted Challenge Response HTTP Authentication Mechanism", rfc7804, A. Melnikov, Internet Engineering Task Force (IETF), Mar. 2016 (retrieved from https://datatracker.ietf.org/doc/html/rfc7804), 18 pages.
RFC Editor, "Salted Challenge Response HTTP Authentication Mechanism", rfc7804, Alexey Melnikov, Internet Engineering Task Force (IETF), Mar. 2016, last update Sep. 11, 2018, 11 pages.
T. Hunt, ";- have i been pwned?", Troy Hunt, troyhunt.com project, (retrieved from https://haveibeenpwned.com/) Nov. 2021, 1 pages.
B. Babati, "5 ways attackers can bypass two-factor authentication", Barbara Babati, Hoxhunt, Copyright 2021 (retrieved from https://www.hoxhunt.com/blog/5-ways-to-bypass-two-factor-authentication/) Nov. 16, 2021, 6 pages.
Logmein, "LastPass . . . How do I update site passwords using Auto Change?", (retrieved from https://support.logmeininc.com/lastpass/help/how-do-i-update-site-passwords-using-auto-change), Nov. 16, 2021, 1 page.
McAfee, "The Ultimate Protection For your Mobile Life", McAfee Mobile Security, Copyright 2021 (retrieved from https://www.mcafeemobilesecurity.com) Nov. 30, 2021, 1 page.
Burp Suite, "Burp Suite is the choice of security professionals worldwide", Copyright 2021 (retrieved from https://portswigger.net/burp), Nov. 16, 2021, 3 pages.
SpyCloud, "Preventing Account Takeover for 2+ Billion Accounts", SpyCloud Inc., Copyright 2021 (retrieved from https://portal.spycloud.com/), 3 pages.
M. Tiwari, "Google IO: New password manager in chrome will help users identify and change leaked passwords", Manas Tiwari, New Delhi, indiatoday.com, May 19, 2021 (retrieved from https://www.indiatoday.in/technology/news/story/google-io-new-password-manager-in-chrome-will-help-users-identifyand-change-leaked-passwords-1804255-2021-05-19), 2 pages.
McAfee, True Key, "Sign in Once", Copyright 2021, McAfee LLC (retrieved from https://www.truekey.com/), Nov. 30, 2021, 2 pages.
K. Robinson, "Is email based 2FA a good idea?", Kelley Robinson, Twilio, Apr. 7, 2020 (retrieved from https://www.twilio.com/blog/email-2fa-tradeoffs), 4 pages.
Verizon, "DBIR 2021 Data Breach Investigations Report" Master's Guide, Verizon, 2021, 119 pages.
Wikipedia, "Cold boot attack", Oct. 22, 2021, (retreived from https://en.wikipedia.org/w/index.php?title=Cold_boot_attack&oldid=1051225624), 5 pages.
Wikipedia, "RainbowCrack", Apr. 11, 2017, (retrieved from https://en.wikipedia.org/w/index.php?title=RainbowCrack&oldid=918344044), last edited Sep. 28, 20219, 1 page.
Wikipedia, "Salted Challenge Response Authentication Mechanism" (SCRAM), Aug. 20, 2021 (retrieved from https://en.wikipedia.org/w/index.php?title=Salted_Challenge_Response_Authentication_Mechanism&oldid=1039725365), 5 pages.
International Searching Authority, "International Search Report and Written Opinion," issued in connection with International Application No. PCT/US2022/049138, dated Mar. 15, 2023, 12 pages.
National Bureau of Standards, "Federal Information Processing Standards Publication: password usage NBS FIPS 112," National Institute of Standards and Technology, retrieved from https://nvlpubs.nist.gov/nistpubs/Legacy/FIPS/fipspub112.pdf on Dec. 31, 1985, 60 pages.

* cited by examiner

METHODS AND APPARATUS TO GENERATE DYNAMIC PASSWORD UPDATE NOTIFICATIONS

FIELD OF THE DISCLOSURE

This disclosure relates generally to password security and, more particularly, to methods and apparatus to generate dynamic password update notifications.

BACKGROUND

Inadequate password management is a common cause of security breaches of organizations that use application software to interact with end users. The safety of user login information (e.g., usernames and passwords) is dependent upon how securely organizations send and store user login information. Organizations can send and store usernames and passwords in plain-text, using encryption techniques (e.g., Base64, URL encoding, Triple DES, etc.), or using hashing algorithms (e.g., Message Digest (MD-5), Secure Hashing Algorithm (SHA), Tiger algorithm, etc.).

Figure 1:
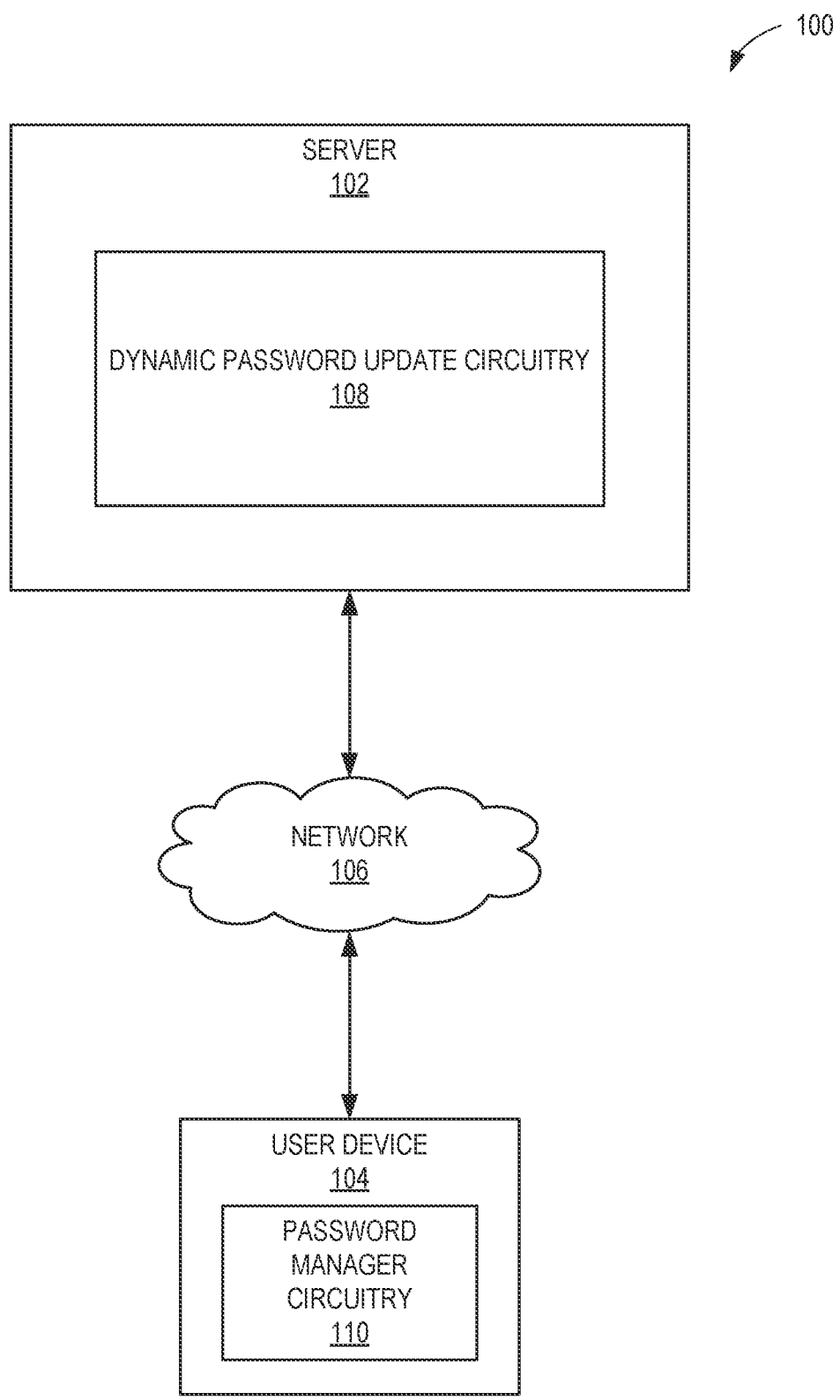
FIG. 1 is a block diagram of an example dynamic password update notification system.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Encryption methods encode plain-text usernames and/or passwords into strings of variable length using a key. Encrypting information is efficient but may be vulnerable to hackers with enough computing power or a stolen decryption key. Hash algorithms receive inputs of variable-length strings and output them into irreversible, encoded, fixed-length strings according to the hashing algorithm. Hashing information is vulnerable to brute force attacks and rainbow tables. Hashing algorithms can also add random strings to passwords before hashing to produce a salted hashed password. Thereby, two identical passwords would be encoded into the same hashed password but into different salted hashed passwords.

Some privacy protection measures use breach detection to search for breaches of organizations after data breaches occur and user information is leaked onto the dark web. Tools such as "SpyCloud" or ";—have i been pwned?" can supply breach reports to companies who have been breached or to users whose login information has been compromised. However at that point, sensitive user information has already been accessed by third parties and likely leaked to other malicious groups. An electronic user device such as a laptop, tablet, or smartphone can include applications and/or browser extensions (e.g., True Key, WebAdvisor, McAfee® Mobile Services, etc.) that protects user passwords, blocks malware, keeps stored data secured from outside threats, etc.

Disclosed herein are example systems, apparatus, and methods for dynamically updating passwords and notifying users of password update suggestions and/or automatic password updates at intervals based on a breach risk classification determined for a service and automatic update mechanism(s) the service uses. The service being a company, organization, affiliation, and/or group with which a user has an account. As used herein, the term "service" refers to a company and/or organization that operates online and interacts with user via application software (e.g., web applications (e.g., static web app, dynamic web app, E-commerce, portal web app, content management system, etc.)). As used henceforth, the term "interval" refers to a dynamically recurring period of time that passes before a password update notification is provided to the user by the system. For example, if the interval is 10 weeks, the user will receive the password update notification after a 10 week interval has expired. As used herein, the term "breach" refers to unauthorized access to user information (e.g., usernames and/or passwords) that a service either stores in volatile and/or non-volatile memory or transmits across a wired or wireless network.

The teachings disclosed herein provide example implementations that notify users of password update suggestion(s) and/or automatic password update(s) at dynamic intervals based on the breach potential of the service(s) with which the users have accounts and the automatic update mechanism(s) the service provides to the user. Examples disclosed herein notify users of requirements for password updates and/or suggestions at instances where the interval expires, at which time the interval begins again and a notification is again sent to the user at the interval expiration. The notification interval for a given service remains unchanged if the security factor(s) associated with the service remain unchanged, the process(es) of classifying a breach potential remain unchanged, the user's configuration setting(s) of the notifications remains unchanged, and/or the user still maintains an account with the service.

In the examples disclosed herein, password update suggestion(s) and/or automatic password update notification(s) are provided to the user at dynamic intervals via example browser extensions integrated with the capabilities of the disclosed examples to interface with the user. Examples disclosed herein include dynamic password update manager circuitry to determine and classify the breach risk of service(s) based on the service(s)' security practices, breach history, and/or the sensitivity of user information the service stores.

Some examples disclosed herein can implement a sandbox environment to identify the password management technique(s), second factor authentication mechanism(s), the breach history, and the critical nature of service(s) that interface with users via application software. As used herein, a sandbox environment is an isolated environment where users, developers, software, etc. can safely test suspicious code without risk to the device or network that operates the sandbox environment. Some examples disclosed herein additionally use sandbox environments to create sample user accounts to safely examine the password exchange technique(s) implemented by service(s).

Examples disclosed herein use breach risk determiner circuitry to determine a breach risk classification of a service based on the security risk factors identified and/or determined within the sandbox environment. The examples disclosed herein store the breach risk classifications of various service(s) in a breach risk data store. In some examples, the breach risk data store contains further data stores to partition the various types of breach risk classifications. For example, some service(s) can be classified as being at a high, medium, or low risk for data breaches. In some examples, the breach risk classification of various service(s) can be dynamically updated based on the security factors identified and/or determined in the sandbox environment.

Examples disclosed herein use a password notification engine to provide the user of the service with password update notifications at dynamic intervals determined based on the breach risk classification of the service and automatic update mechanism(s) the service uses. In the examples disclosed herein, the term "notification" can refer to an indication (e.g., push notification, short message service (SMS), Email, etc.) provided to the user and/or user device that an automatic password update and/or a password update suggestion has been generated. In some examples, if a user has agreed to allow the system to automatically update his or her password (given the service provides automatic update mechanism(s)), then the system will notify the user of the update and the suggested password used for the update. In other examples, a user may receive a notification from the system that a predetermined interval has elapsed and that a password update is recommended with a generated password suggestion of equal or greater strength than the previously used password.

Examples disclosed herein provide the user with dynamic password update notifications sent via a user interface installed on the user device (e.g., application, browser extension, etc.). In the examples disclosed herein, the dynamic password update manager circuitry implements a browser extension to notify the user of an elapsed interval for a service and the password update suggestion for the service. In some examples, the dynamic password update manager circuitry can use service account identifier circuitry to analyze a user's telemetry data (gathered via the browser extension) and identify the service(s)' application software the user accesses with a username and a password. Thus, in the examples disclosed herein, the browser extension on the user device sends inputs (e.g., telemetry data) to and receives outputs (e.g., password update notifications) from the dynamic password update manager circuitry. In examples disclosed herein, the dynamic password update manager circuitry can be integrated on a server. The example integrated dynamic password update manager circuitry can also transmit data to and from the user device via a network.

FIG. 1 illustrates an example dynamic password update notification system 100 constructed in accordance with teachings of this disclosure for determining a breach risk classification of a service and notifying a user of dynamic password updates at intervals determined based on the service's breach risk classification and the service's use of automatic update mechanism(s). The example dynamic password update notification system 100 of FIG. 1 includes a server 102 in communication with a user device 104 through a network 106. The server 102 of the example FIG. 1 may include processor circuitry in which dynamic password update circuitry 108 is located.

The server 102 of example FIG. 1 can be a computer hardware device or a software program that performs one or more service(s) (e.g., Web service, Windows service) for a user or client. In some examples, the server 102 may implement processor circuitry to operate dynamic password update circuitry 108. The example server 102 can host the dynamic password update manager circuitry 108 either fully or partially on the server 102 or distributed among a plurality of servers (e.g., application servers, catalog servers, communications servers, computing servers, database servers, etc.). The processor circuitry of the example server 102 may be a semiconductor-based hardware logic device. The hardware processor circuitry may implement a central processing unit (CPU) of the server 102, may include any number of cores, and may be implemented by a commercially available processing service. In some examples, the processor circuitry executes machine readable instructions (e.g., software) to implement dynamic password update circuitry 108.

The user device 104 of the example FIG. 1 can be a personal computing device such as a laptop, a desktop computer, an electronic tablet, a smartphone, etc. The example user device 104 includes password manager circuitry 110. The password manager circuitry 110 can implement a browser extension and/or an application software that provide(s) an interface to the user for receiving password update notifications and managing and/or storing passwords for application software of service(s). In some examples, the password manager circuitry 110 is a third party solution that is programmed with the capability of communicating with the dynamic password update circuitry 108. In some examples, the password manager circuitry 110 implements known software (e.g., application, browser extension, etc.) that is installed and/or stored on the user device 104 and updated to communicate information with example dynamic password update circuitry 108.

The network 106 of example FIG. 1 can pass telemetry data from the password manager circuitry 110 to the dynamic password update circuitry 108. The example network 106 can also pass password update notifications to the password manager circuitry 110. In some examples, the network 106 can be a local area network (LAN), a personal area network (PAN), a metropolitan area network (MAN), a wide area network (WAN), or another type of wired or wireless network that facilitates information exchange.

In operation, the example dynamic password update notification system 100 of FIG. 1 can send password update suggestion(s) and/or automatic password update notification(s) to the password manager circuitry 110 based on breach risk classifications determined by the dynamic password update circuitry 106. In some examples a user of the user device 104 has password-protected account(s) with service(s). In some examples, the user interfaces with the service(s) via application software. The example password manager circuitry 110 collects telemetry data indicating the service(s) with which the user has an account and sends the telemetry data to the server 102 through the network 106.

In further operation, the example dynamic password update circuitry 108 determines high, medium, or low breach risk classification(s) of the service(s) that are identified by the telemetry data. The example breach risk classification is determined by the dynamic password update circuitry based on the password management techniques used by the service(s), the past data breaches experienced by the service(s), the type of second factor authentication mechanism(s) used by the service(s), and/or the critical nature of the service(s). The example dynamic password update circuitry 108 can generate password update suggestion(s) for the user and send the suggestion(s) to the password manager circuitry 110 at a first recurring interval. The example first recurring interval is determined based on the breach risk classification (e.g., the shortest first recurring interval for the highest breach risk classification). The example dynamic password update circuitry 108 can also generate password update suggestion(s), automatically update the password(s), and send notification(s) of the update(s) to the password manager circuitry 110 if the user has opted into an automatic password update mechanism implemented by the service. If the user has opted into automatic password updates, then the example dynamic password update circuitry 108 updates the user password(s) and notifies the user at a second recurring interval that is shorter that the first recurring interval.

Figure 2:
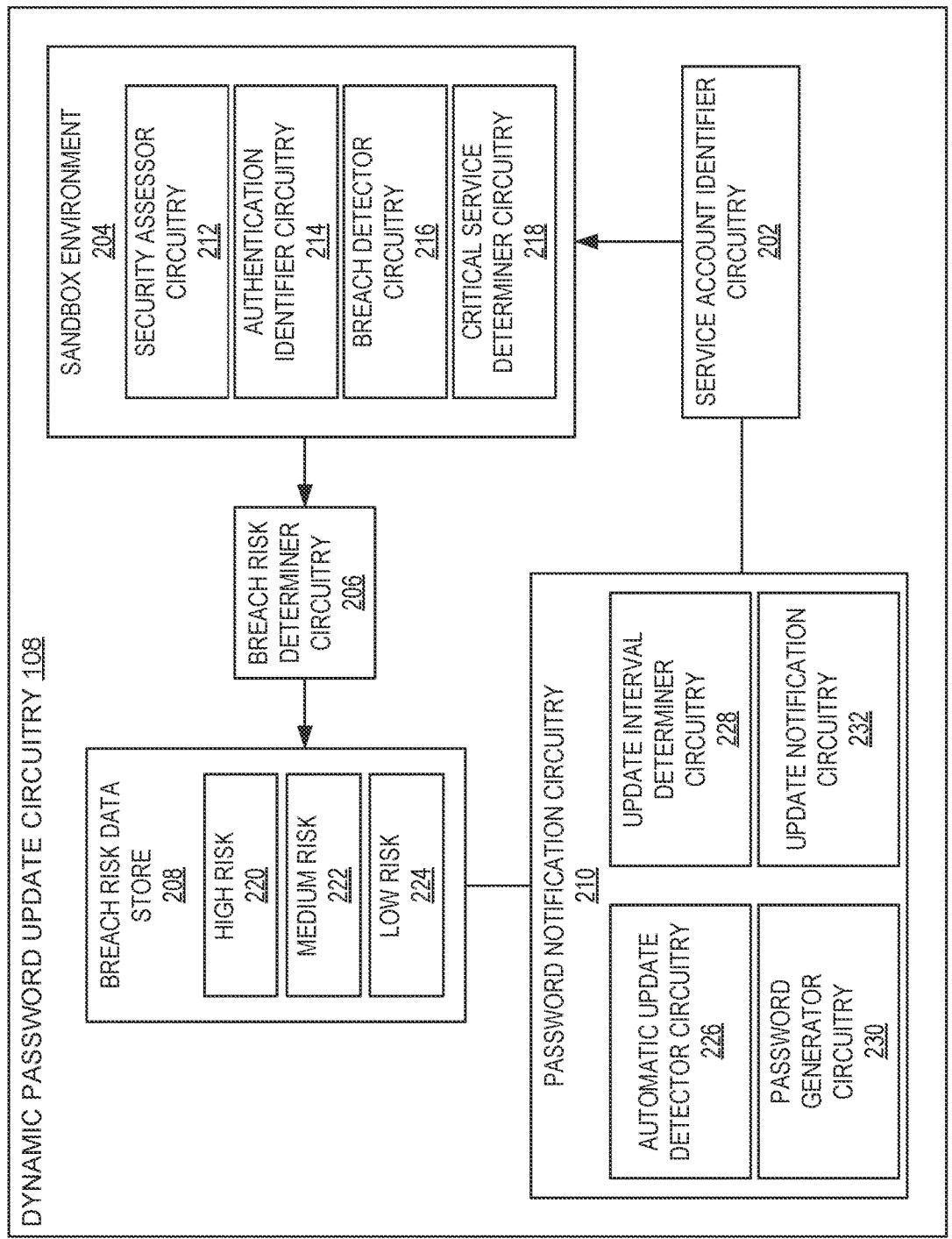
FIG. 2 is a block diagram of example dynamic password update manager circuitry constructed in accordance with the teachings of this disclosure.

FIG. 2 is a block diagram of an example implementation and/or operation of the dynamic password update circuitry 108 of FIG. 1. The example dynamic password update circuitry 108 is structured to implement service account identifier circuitry 202 to identify the service(s) with which a user has an account and send the service identifier(s) to a sandbox environment 204. The dynamic password update circuitry 108 implements the example sandbox environment 204 to identify and/or determine various security factors and sends that information to breach risk determiner circuitry 206 to determine breach risk classification(s) of the service(s). The example breach risk classification(s) determined by the breach risk determiner circuitry 206 are stored in a breach risk data store 208, and password notification circuitry 210 generates password update suggestion(s) and/or notification(s) for the service(s) based on the breach risk classification(s) determined for the service(s). The example password notification circuitry 210 sends the suggestion(s) and/or notification(s) to the password manager circuitry 110 of FIG. 1. In the example of FIG. 2, the dynamic password update circuitry 108 is implemented by one or more processor circuitry of the server 102. In some examples, some of the security factor identification or determination, breach risk determination, breach risk classification storage, and/or password update notification is implemented by the processor circuitry of the server 102, processor circuitry of the user device 104, and/or processor circuitry of some other server and/or device.

The example service account identifier circuitry 202 of FIG. 2 communicates with the password manager circuitry 110 on the user device 104 of FIG. 1 to identify the service(s) with which the user has password-protected account(s). As previously mentioned, the password manager circuitry 110 can implement an existing software, application, and/or browser extension (e.g., True Key, WebAdvisor, McAfee® Mobile Services, etc.) that manages the passwords and/or accounts that the user has established. In some examples, the password manager circuitry 110 will collect telemetry data indicating the service(s) with which the user interacts and has an account. The example service account identifier circuitry 202 receives the telemetry data and compiles a list of the service(s) accessed by the user. In some examples, the service account identifier circuitry 202 provides the service list to a sandbox environment 204 at predetermined time periods, at instances in which the user makes an account with a new service, removes an account from a current service, and/or another set parameter.

The example sandbox environment 204 illustrated in FIG. 2 includes security assessor circuitry 212, authentication identifier circuitry 214, breach detector circuitry 216, and critical service determiner circuitry 218 implemented by the processor circuitry of the server 102 illustrated in FIG. 1. The sandbox environment 204 provides the included hardware and operations within an isolated environment in which the circuitry can create sample user account(s), monitor service(s)' password exchange technique(s), identify authentication mechanism(s) the user implements, detect service(s)' breach history, and determine a critical nature of the service(s).

In the example of FIG. 2, security assessor circuitry 212 detects the security mechanism(s) that the service(s) use to send and receive passwords to and from the user device 104. In some examples, the security assessor circuitry 212 creates a sample user account with the service(s) to see what security measures the service(s) use when transmitting user login information. In some examples, the security assessor circuitry 212 implements a vulnerability scanner (e.g., Burp-Suite) to detect the security measures (e.g., plain-text, encryption, hashing, and/or salted hashing) the service(s) implement for transmitting password(s) from the sample user account and vice versa. In some examples, it is possible that the service(s) stores password data using the same security measures used to transmit the password data. In some examples, it is possible that the service keeps password data in memory for comparison using the same security measures used to transmit the passwords. Some instances of breaches do not solely occur for stored data but can also be susceptible to Transport Layer Security (TLS) based attacks. In examples where the service(s) are breached by TLS based attacks, the security measures the service(s) implement for transmitting user password data relates directly to the breach risk of that service.

The example security assessor circuitry 212 of FIG. 2 can determine if the service uses a secure hashing algorithm or an insecure hashing algorithm. In some examples, insecure hashing algorithms are considered hashing algorithms that do not meet current standards of cryptographic security. For example, MD-5 or SHA-1 have been deprecated by the National Institute of Standard and Technology (NIST) and would be considered insecure hashing algorithms. If the service implemented a hashing algorithm that the NIST has deprecated and/or a hashing algorithm that was replaced by a more up-to-date version (e.g., SHA-3 over SHA-1), then the example security assessor circuitry 212 would determine that the service uses an insecure hashing algorithm.

The example authentication identifier circuitry 214 of FIG. 2 uses telemetry data received from the service account identifier circuitry 202 to identify if the user is implementing second factor authentication mechanism(s) for the given service, and if so, which type of second factor authentication mechanism(s) are used. In some examples, the second factor authentication mechanism(s) may be an authenticator application (e.g., Google Authenticator, Duo, etc.). In other examples, the second factor authentication mechanism(s) may be a fixed code based second factor authentication (e.g., short message service (SMS), email, etc.). Implementing the authenticator application provides greater security for user information than implementing the fixed code based second factor authentication mechanism(s). This is partly due to the increased difficulty for a hacker to gain physical access to the user device 104 and generate a code without the user knowing about the breach.

In the example of FIG. 2, breach detector circuitry 216 detects if the service(s) with which the user has an account have had any previous breach occurrences. The example breach detector circuitry 216 can implement tools, software, and/or resources (e.g., "SpyCloud", ";—have i been pwned?", etc.) to detect if user information stored and/or sent by the service(s) have been accessed by unauthorized parties in the past. In some examples, the breach detector circuitry 216 searches for and detects breaches during the lifespan of the service(s), during the period in which the service(s) implemented application software to interface with users, and/or another time period of the service's operational history.

The example critical service determiner circuitry 218 of FIG. 2 uses predetermined categories to determine if the service(s) are within a critical category. In some examples, the predetermined categories are McAfee® Global Threat Intelligence (GTI) categories some of which are classified as critical categories. The example GTI categories include millions of services and over 90 categories that are compiled by researchers and automatic tools. In some examples, the critical categories include service(s) that operate in sectors that deal with sensitive user data (e.g., banking, finance, health, government, stock trading, E-commerce, etc.). The example critical categories are categorized as such due to the critical nature of the user data with which the service(s) operate.

The example dynamic password update circuitry 108 illustrated in FIG. 2 includes breach risk determiner circuitry 206. In some examples, the breach risk determiner circuitry 206 uses the information gathered in the example sandbox environment 204 to determine the breach risk classification of the service(s) with which the user has an account. The example breach risk determiner circuitry 206 can classify the service(s) as having at least a high breach risk, a medium breach risk, or a low breach risk. In some examples, the breach risk determiner circuitry 206 will determine an initial breach risk for the service(s) based on an input the breach risk determiner circuitry 206 receives from the security assessor circuitry 212. For example, if the service(s) send and/or receive user login information in plain-text and/or using encryption, the breach risk determiner circuitry 206 will classify the service(s) as having the high breach risk classification. In another example, if the service(s) send and/or receive user login information using an insecure hashing algorithm, the breach risk determiner circuitry 206 will classify the service(s) as having the high breach risk classification. In another example, if the service(s) send and/or receive user login information using a secure hashing algorithm, the breach risk determiner circuitry 206 will classify the service(s) as having the medium breach risk classification. In another example, if the service(s) send and/or receive user login information using a salted hashing algorithm, the breach risk determiner circuitry 206 will classify the service(s) as having the low breach risk classification.

The example breach risk determiner circuitry 206 can adjust the initial breach risk classification based on information the other components of the sandbox environment send to the breach risk determiner circuitry 206. In some examples, the breach risk determiner circuitry 206 will adjust the breach risk of the service(s) based on an input the breach risk determiner circuitry 206 receives from the authentication identifier circuitry 214. For example, if the service(s) do not offer second factor authentication mechanism(s) to the user or if the user does not implement the second factor authentication mechanism(s), then the breach risk determiner circuitry 206 will increase the service(s)' breach risk classification (e.g., from medium to high breach risk). In another example, if the user implements an authenticator application as the second factor authentication mechanism(s), then the breach risk determiner circuitry 206 will decrease the service(s)' breach risk classification (e.g., from high to medium breach risk). In another example, if the user implements a fixed code authentication mechanism, then the breach risk determiner circuitry 206 will keep the service(s)' breach risk classification the same.

The example breach risk determiner circuitry 206 can further adjust the breach risk classification(s) based on information the other components of the sandbox environment 204 send to the breach risk determiner circuitry 206. In some examples, the breach risk determiner circuitry 206 will adjust the breach risk classification(s) of the service(s) based on an input the breach risk determiner circuitry 206 receives from the critical service determiner circuitry 218. For example, if the critical service determiner circuitry 218 determines that the service(s) are included in a critical category, then the breach risk determiner circuitry 206 will increase the service(s)' breach risk classification (e.g., from medium to high breach risk). In some examples, the breach risk determiner circuitry 206 will have already classified the service(s) as having a high breach risk based on the input received from the security assessor circuitry 212. In such examples, the breach risk determiner circuitry 206 will keep the service(s)' breach risk classification as being of a high breach risk if the critical service determiner circuitry 218 determines that the service is a critical service.

The example breach risk determiner circuitry 206 can further adjust the breach risk classification(s) based on information the other components of the sandbox environment 204 send to the breach risk determiner circuitry 206. In some examples, the breach risk determiner circuitry 206 will adjust the breach risk classification(s) of the service(s) based on an input the breach risk determiner circuitry 206 receives from the breach detector circuitry 216. For example, if the breach detector circuitry 216 detects that the service(s) have been previously breached, then the breach risk determiner circuitry 206 will increase the service(s)' breach risk classification(s) (e.g., from medium to high breach risk). In some examples, the breach risk determiner circuitry 206 will have already classified the service(s) as having a high breach risk based on the input received from the security assessor circuitry 212. In such examples, the breach risk determiner circuitry 206 will keep the service(s)' breach risk classification as being of a high breach risk if the breach detector circuitry 216 detects that the service(s) has been previously breached.

The example dynamic password update circuitry 108 illustrated in FIG. 2 includes a breach risk data store 208. The breach risk determiner circuitry 206 determines the breach risk classification(s) of the service(s) and stores the service(s) into at least one of the data stores within the breach risk data store 208. The breach risk data store 208 includes a high risk data store 220, a medium risk data store 222, and a low risk data store 224.

The example dynamic password update circuitry 108 illustrated in FIG. 2 includes a password notification circuitry 210. The password notification circuitry 210 includes automatic update detector circuitry 226, update interval determiner circuitry 228, password generator circuitry 230, and update notification circuitry 232. The automatic update detector circuitry 226 of the example password notification circuitry 210 detects if the service(s) provide automatic password update mechanism(s) to the user and if the user opts into implementing the automatic password update mechanism(s) offered by the service(s). The example update interval determiner circuitry 228 determines recurring password update suggestion and/or notification interval(s) based on the breach risk classification(s) of the service(s) and the automatic password update mechanism(s) the service(s) offer. The password generator circuitry 230 generates unique (e.g., previously unused) password update suggestion(s), and the update notification circuitry 232 notifies the user of automatic password update(s) and/or password update suggestion(s).

The password notification circuitry 210 illustrated in FIG. 2 includes automatic update detector circuitry 226. The example automatic update detector circuitry 226 detects if service(s) provide automatic password update(s) to the user. In some examples, automatic password updates are mechanisms that update a user's password without the user having to interact with the update (e.g., Auto Change, Single Tap Change, etc.). In some examples, the automatic update detector circuitry 226 uses the sample user account made by the security assessor circuitry 212 to detect if the service(s) provide automatic password update mechanism(s) to the sample user account. In some examples, the automatic update detector circuitry 226 creates a sample user account with the service(s) and detects if the service(s) provide automatic update mechanism(s) to the sample user account.

The example update interval determiner circuitry 228 determines a recurring update interval at which the update notification circuitry 232 notifies the user device of automatic password update(s) and/or password update suggestion(s). In some examples, the update interval determiner circuitry 228 determines the recurring update interval based on the breach risk classification(s) determined for the service(s) and whether the service(s) provide automatic password update mechanism(s) to the user. For example, if the service(s) are classified as having a high breach risk classification and do not provide automatic password update mechanism(s) to the user, then the update interval determiner circuitry 228 determines a first recurring interval (e.g., two weeks) at which time the update notification circuitry 232 provides the user device 104 with a notification of a password update suggestion. In another example, if the service(s) are classified as having a high breach risk classification and do provide automatic password update mechanism(s) to the user, then the update interval determiner circuitry 228 determines a recurring interval that is less than the first recurring interval (e.g., one week) at which time the update notification circuitry 232 provides the user device 104 with a notification of an automatically updated password and/or a password update suggestion. In another example, if the service(s) are classified as having a medium breach risk classification and does not provide automatic password update mechanism(s) to the user, then the update interval determiner circuitry 228 determines a second recurring interval that is greater than the first recurring interval (e.g., eight weeks) at which time the update notification circuitry 232 provides the user device 104 with a notification of a password update suggestion. In another example, if the service(s) are classified as having a medium breach risk classification and do provide automatic password update mechanism(s) to the user, then the update interval determiner circuitry 228 determines a recurring interval that is greater than the first recurring interval and less than the second recurring interval (e.g., four weeks) at which time the update notification circuitry 232 provides the user device 104 with notification(s) of an automatically updated password(s) and/or password update suggestion(s). In another example, if the service(s) are classified as having a low breach risk classification, then the update interval determiner circuitry 228 determines a third recurring interval that is greater than the second recurring interval (e.g., sixteen weeks) at which time the update notification circuitry 232 provides the user device 104 with notification(s) of automatically updated password(s) and/or password update suggestion(s).

The example update interval determiner circuitry 228 illustrated in FIG. 2 can dynamically determine the recurring interval at which to notify the user device 104 of automatic password update(s) and/or password update suggestion(s). For example, the breach risk determiner circuitry 206 could have previously determined that the service(s) are classified as having a high breach risk because the service(s) send user passwords in plain-text. For such examples if the service(s) changed their password management protocol(s) to send user passwords with a salted hashing algorithm, then the update interval determiner circuitry 228 would be informed of such a change and increase the recurring interval from the first recurring interval (e.g., two weeks) to the third recurring interval (e.g., sixteen weeks). In some examples, the recurring interval determined by the update interval determiner circuitry 228 is a recurring time period that resets when the password notification circuitry 210 notifies the user device 104 of automatic password update(s) and/or password update suggestion(s). In such examples, the moment at which the recurring interval expires, the update notification circuitry 232 notifies the user device 104 of automatic password update(s) and/or password update suggestion(s).

The password notification circuitry 210 illustrated in FIG. 2 includes password generator circuitry 230. The example password generator circuitry 230 can be a hardware device, software program, online tool, or any combination of the preceding examples that generate(s) pseudo-random password strings for the service(s) with which users have accounts. In some examples, the password generator circuitry 230 can receive information regarding the service(s) with which the user has accounts from the service account identifier circuitry 202. In some examples, the password generator circuitry 230 can receive information regarding the service(s) with which the user has accounts from the password manager circuitry 110 of FIG. 1. In some examples, the password generator circuitry 230 can use the password manager circuitry 110 to store a list of the user's passwords as reference such that the password generator circuitry 230 generates unique passwords (e.g., different from previously used passwords) for the various service(s) with which the user has accounts and generates passwords updates of equal or greater strength than the password preceding the update.

The example password generator circuitry 230 can generate updated password(s) as password update suggestion(s) and/or as automatic password update(s) directly in the service(s)' application software. In some examples, the service(s) do not provide automatic password update mechanism(s) to the user. In such examples, the password generator circuitry 230 generates password update suggestion(s) for the service at the expiration of the interval for that service. The example password update suggestion(s) are provided to the user in the form of notification(s), and the user can choose to update the password(s) for the service(s) with the password update suggestion(s) via the password manager circuitry 110. In some examples, the service(s) do provide automatic password update mechanism(s) to the user. In such examples, the password generator circuitry 230 generates updated password(s) for the service(s) and automatically changes the password(s) for the user if the user has complied with an automatic password update setting via the password manager circuitry 110.

The example password notification circuitry 210 illustrated in FIG. 2 includes update notification circuitry 232. The example update notification circuitry 232 sends notifications to the user device 104 at the expiration of the recurring interval and/or at the time the password generator circuitry 230 generates the updated password suggestion(s) and/or automatically updates the password(s). In some examples, the update notification circuitry 232 notifies the user device 104 with a push notification via the password manager circuitry 110, an SMS message, an email message, and/or another message.

In some examples, the dynamic password update circuitry 108 includes means for identifying service(s) with which a user has account(s). For example, the means for identifying may be implemented by service account identifier circuitry 202. In some examples, the service account identifier circuitry 202 may be implemented by machine executable instructions such as that implemented by at least block 302 of FIG. 3 executed by processor circuitry, which may be implemented by the example processor circuitry 712 of FIG. 7, the example processor circuitry 800 of FIG. 8, and/or the example Field Programmable Gate Array (FPGA) circuitry 900 of FIG. 9. In other examples, the service account identifier circuitry 202 is implemented by other hardware logic circuitry, hardware implemented state machines, and/or any other combination of hardware, software, and/or firmware. For example, the service account identifier circuitry 202 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the dynamic password update circuitry 108 includes means for identifying password management technique(s) a service uses. For example, the means for identifying may be implemented by security assessor circuitry 212. In some examples, the security assessor circuitry 212 may be implemented by machine executable instructions such as that implemented by at least blocks 304 of FIGS. 3 and 402, 404, 408, 412, and 416 of FIG. 4 executed by processor circuitry, which may be implemented by the example processor circuitry 712 of FIG. 7, the example processor circuitry 800 of FIG. 8, and/or the example Field Programmable Gate Array (FPGA) circuitry 900 of FIG. 9. In other examples, the security assessor circuitry 212 is implemented by other hardware logic circuitry, hardware implemented state machines, and/or any other combination of hardware, software, and/or firmware. For example, the security assessor circuitry 212 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the dynamic password update circuitry 108 includes means for identifying second factor authentication mechanism(s) a service uses. For example, the means for identifying may be implemented by authentication identifier circuitry 214. In some examples, the authentication identifier circuitry 214 may be implemented by machine executable instructions such as that implemented by at least blocks 306 of FIGS. 3 and 502, 504, 508, 510, and 514 of FIG. 5 executed by processor circuitry, which may be implemented by the example processor circuitry 712 of FIG. 7, the example processor circuitry 800 of FIG. 8, and/or the example Field Programmable Gate Array (FPGA) circuitry 900 of FIG. 9. In other examples, the authentication identifier circuitry 214 is implemented by other hardware logic circuitry, hardware implemented state machines, and/or any other combination of hardware, software, and/or firmware. For example, the authentication identifier circuitry 214 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the dynamic password update circuitry 108 includes means for detecting previous breaches of a service. For example, the means for detecting may be implemented by breach detector circuitry 216. In some examples, the breach detector circuitry 216 may be implemented by machine executable instructions such as that implemented by at least block 312 of FIG. 3 executed by processor circuitry, which may be implemented by the example processor circuitry 712 of FIG. 7, the example processor circuitry 800 of FIG. 8, and/or the example Field Programmable Gate Array (FPGA) circuitry 900 of FIG. 9. In other examples, the breach detector circuitry 216 is implemented by other hardware logic circuitry, hardware implemented state machines, and/or any other combination of hardware, software, and/or firmware. For example, the breach detector circuitry 216 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the dynamic password update circuitry 108 includes means for determining the critical nature of a service with which a user has an account. For example, the means for determining may be implemented by critical service determiner circuitry 218. In some examples, the critical service determiner circuitry 218 may be implemented by machine executable instructions such as that implemented by at least block 308 of FIG. 3 executed by processor circuitry, which may be implemented by the example processor circuitry 712 of FIG. 7, the example processor circuitry 800 of FIG. 8, and/or the example Field Programmable Gate Array (FPGA) circuitry 900 of FIG. 9. In other examples, the critical service determiner circuitry 218 is implemented by other hardware logic circuitry, hardware implemented state machines, and/or any other combination of hardware, software, and/or firmware. For example, the critical service determiner circuitry 218 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the dynamic password update circuitry 108 includes means for determining the breach risk of service with which a user has an account. For example, the means for determining may be implemented by breach risk determiner circuitry 206. In some examples, the breach risk determiner circuitry 206 may be implemented by machine executable instructions such as that implemented by at least blocks 310 and 314 of FIG. 3, 406, 410, 414, and 418 of FIG. 4, and 506, 512, and 516 of FIG. 5 executed by processor circuitry, which may be implemented by the example processor circuitry 712 of FIG. 7, the example processor circuitry 800 of FIG. 8, and/or the example Field Programmable Gate Array (FPGA) circuitry 900 of FIG. 9. In other examples, the breach risk determiner circuitry 206 is implemented by other hardware logic circuitry, hardware implemented state machines, and/or any other combination of hardware, software, and/or firmware. For example, the breach risk determiner circuitry 206 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the dynamic password update circuitry 108 includes means for detecting automatic password update mechanism(s) a service uses. For example, the means for detecting may be implemented by automatic update detector circuitry 226. In some examples, the automatic update detector circuitry 226 may be implemented by machine executable instructions such as that implemented by at least blocks 318 and 320 FIGS. 3 and 602, 606, and 614 of FIG. 6 executed by processor circuitry, which may be implemented by the example processor circuitry 712 of FIG. 7, the example processor circuitry 800 of FIG. 8, and/or the example Field Programmable Gate Array (FPGA) circuitry 900 of FIG. 9. In other examples, the automatic update detector circuitry 226 is implemented by other hardware logic circuitry, hardware implemented state machines, and/or any other combination of hardware, software, and/or firmware. For example, the automatic update detector circuitry 226 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.)

structured to perform the corresponding operation without executing software or firmware, but other structures are likewise appropriate.

In some examples, the dynamic password update circuitry 108 includes means for determining the interval at which password update notifications are provided to the user device 104. For example, the means for determining may be implemented by update interval determiner circuitry 228. In some examples, the update interval determiner circuitry 228 may be implemented by machine executable instructions such as that implemented by at least blocks 316 of FIGS. 3 and 604, 608-612, and 616-622 of FIG. 6 executed by processor circuitry, which may be implemented by the example processor circuitry 712 of FIG. 7, the example processor circuitry 800 of FIG. 8, and/or the example Field Programmable Gate Array (FPGA) circuitry 900 of FIG. 9. In other examples, the update interval determiner circuitry 228 is implemented by other hardware logic circuitry, hardware implemented state machines, and/or any other combination of hardware, software, and/or firmware. For example, the update interval determiner circuitry 228 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the dynamic password update circuitry 108 includes means for generating password update suggestions for a service with which a user has an account. For example, the means for generating may be implemented by password generator circuitry 230. In some examples, the password generator circuitry 230 may be implemented by machine executable instructions such as that implemented by at least blocks 322 and 324 of FIG. 3 executed by processor circuitry, which may be implemented by the example processor circuitry 712 of FIG. 7, the example processor circuitry 800 of FIG. 8, and/or the example Field Programmable Gate Array (FPGA) circuitry 900 of FIG. 9. In other examples, the password generator circuitry 230 is implemented by other hardware logic circuitry, hardware implemented state machines, and/or any other combination of hardware, software, and/or firmware. For example, the password generator circuitry 230 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the dynamic password update circuitry 108 includes means for notifying a user device 104 of a password update suggestion and/or an automatic password update for a service with which a user has an account. For example, the means for notifying may be implemented by update notification circuitry 232. In some examples, the update notification circuitry 232 may be implemented by machine executable instructions such as that implemented by at least blocks 326 and 328 of FIG. 3 executed by processor circuitry, which may be implemented by the example processor circuitry 712 of FIG. 7, the example processor circuitry 800 of FIG. 8, and/or the example Field Programmable Gate Array (FPGA) circuitry 900 of FIG. 9. In other examples, the update notification circuitry 232 is implemented by other hardware logic circuitry, hardware implemented state machines, and/or any other combination of hardware, software, and/or firmware. For example, the update notification circuitry 232 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

Figure 7:
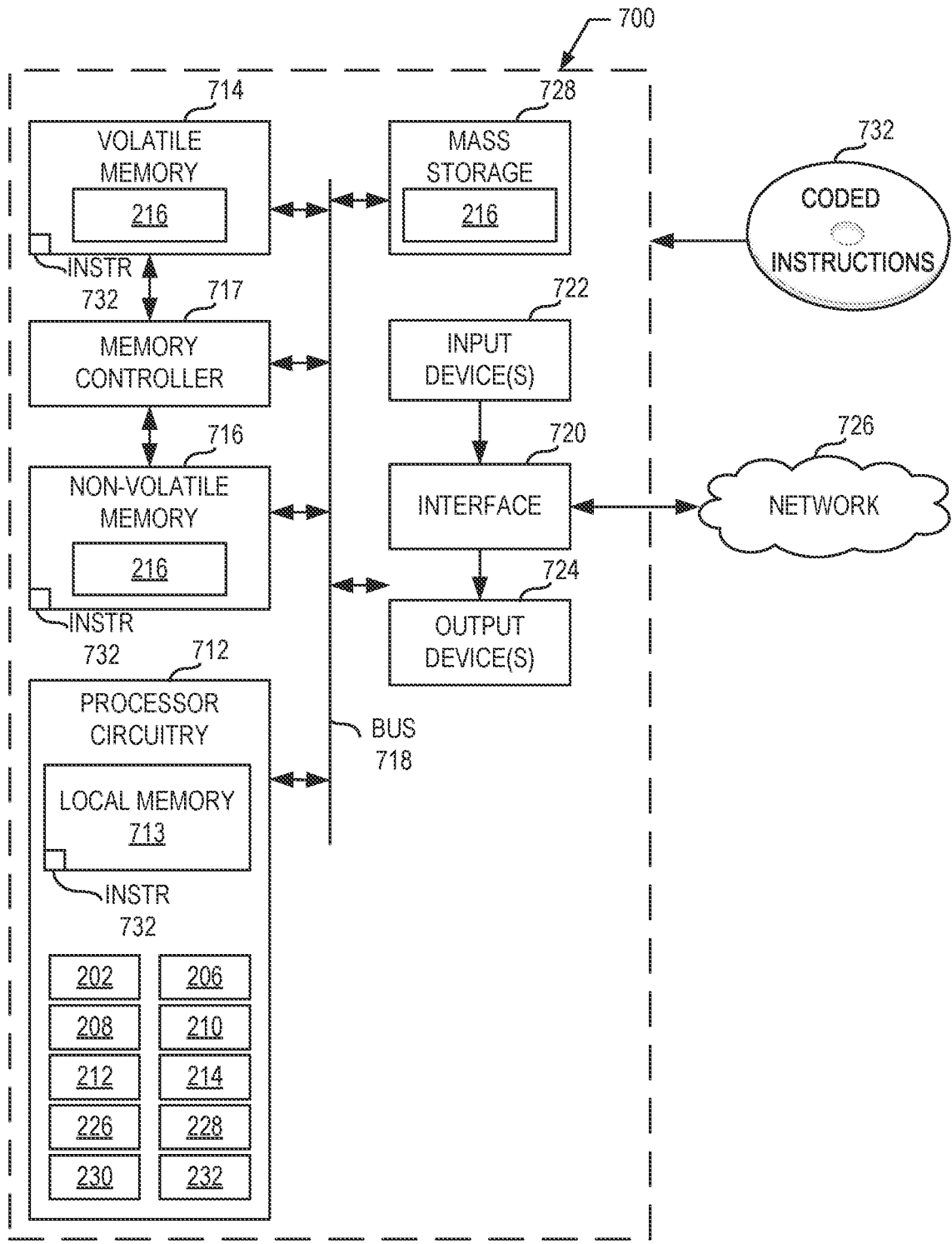
FIG. 7 is a block diagram of an example processing platform including processor circuitry structured to execute the example machine readable instructions of FIGS. 3, 4, 5, and 6 to implement the dynamic password update manager circuitry.

While an example manner of implementing the dynamic password update circuitry 108 of FIG. 2 is illustrated in FIG. 7, one or more of the elements, processes, and/or devices illustrated in FIG. 7 may be combined, divided, re-arranged, omitted, eliminated, and/or implemented in any other way. Further, the example security assessor circuitry 212, the example authentication identifier circuitry 214, the example breach detector circuitry 216, the example critical service determiner circuitry 218, the example breach risk determiner circuitry 206, the example automatic update detector circuitry 226, the example update interval determiner circuitry 228, the example password generator circuitry 230, the example update notification circuitry 232, and/or, more generally, the example dynamic password update circuitry 108 of FIG. 2, may be implemented by hardware alone or by hardware in combination with software and/or firmware. Thus, for example, any of the example security assessor circuitry 212, the example authentication identifier circuitry 214, the example breach detector circuitry 216, the example critical service determiner circuitry 218, the example breach risk determiner circuitry 206, the example automatic update detector circuitry 226, the example update interval determiner circuitry 228, the example password generator circuitry 230, the example update notification circuitry 232, and/or, more generally, the example dynamic password update circuitry 108, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example dynamic password update circuitry 108 of FIG. 2 may include one or more elements, processes, and/or devices in addition to, or instead of, those illustrated in FIG. 7, and/or may include more than one of any or all of the illustrated elements, processes and devices.

A flowchart representative of example hardware logic circuitry, machine readable instructions, hardware implemented state machines, and/or any combination thereof for implementing the dynamic password update circuitry 108 of FIG. 2 is shown in FIG. 7. The machine readable instructions may be one or more executable programs or portion(s) of an executable program for execution by processor circuitry, such as the processor circuitry 712 shown in the example processor platform 700 discussed below in connection with FIG. 7 and/or the example processor circuitry discussed below in connection with FIGS. 8 and/or 9. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 7, many other methods of implementing the example dynamic password update circuitry 108 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 3-6 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 3:
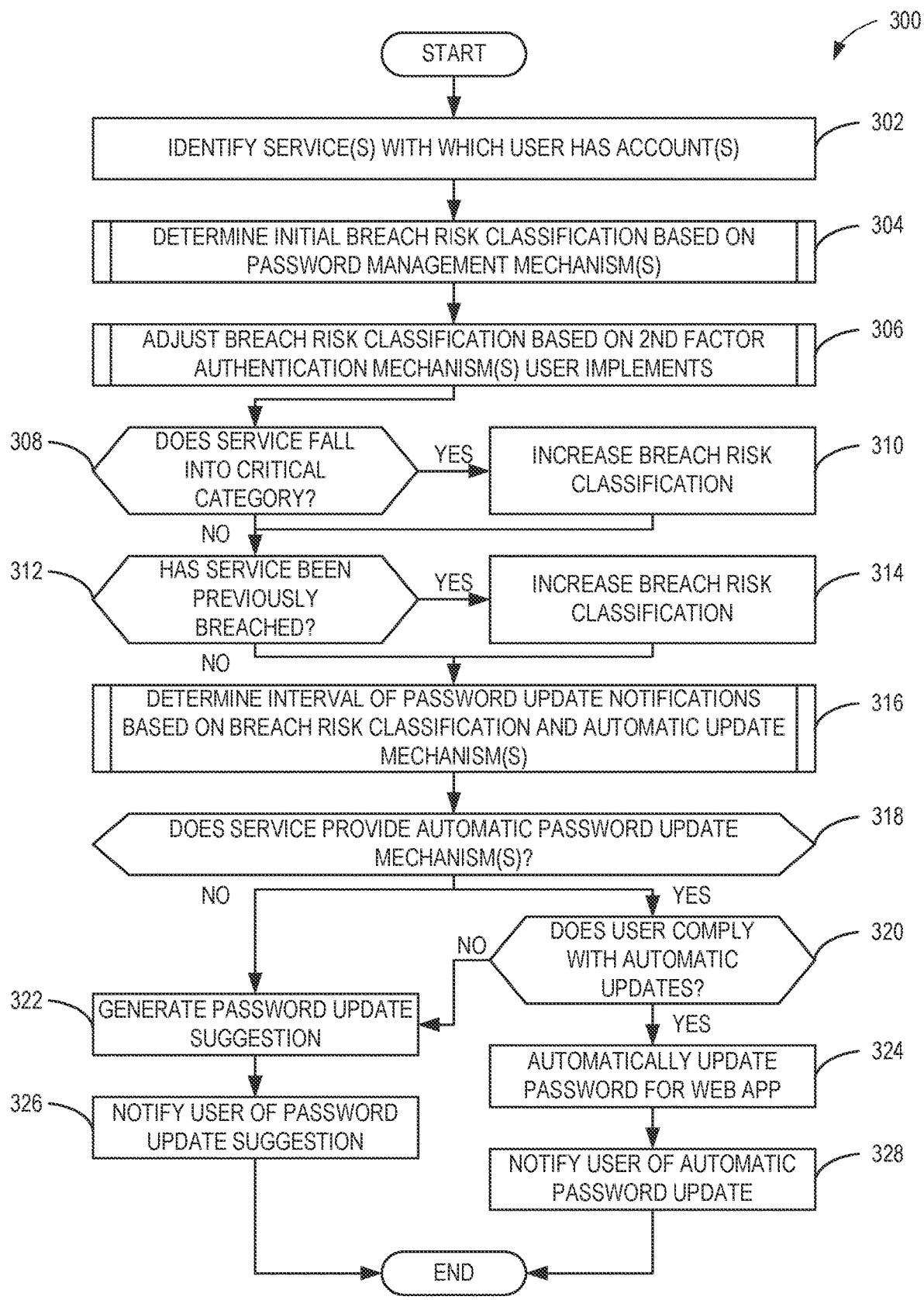
FIG. 3 is a flowchart representative of example machine readable instructions and/or operations that may be executed and/or instantiated by example processor circuitry to implement the dynamic password update manager circuitry of FIG. 2.

FIG. 3 is a flowchart representative of example machine readable instructions and/or example operations 300 that may be executed and/or instantiated by processor circuitry to dynamically notify a user of a generated password update suggestion and/or an automatically updated password based on a determined breach risk potential of service(s) and a determined notification interval. The machine readable instructions and/or operations 300 of FIG. 3 begin at block 302, at which the service account identifier circuitry 202 identifies the service(s) with which the user has one or more accounts.

At block 304, the security assessor circuitry 212 determines the security management technique(s) the service(s) use to exchange and store user password(s). The security assessor circuitry 212 operates in a sandbox environment 204 where the security assessor circuitry 212 creates a test user account and uses hardware devices, software programs, and/or online tools (e.g., BurpSuite) to identify the type(s) of security measures (e.g., plain-text, encryption, hashing, and/or salted hashing) the service(s) implement.

At block 306, the authentication identifier circuitry 214 identifies the second factor authentication mechanism(s) the user implements. The authentication identifier circuitry 214 operates in a sandbox environment and uses telemetry data received from the password manager circuitry 110 to identify if the user implements second factor authentication mechanism(s) to log into the user's account and the type(s) of second factor authentication mechanism(s) the user implements.

At block 308, the critical service determiner circuitry 218 determines if the service(s) are within a critical category based on how the service(s) are classified among the GTI categories.

At block 310, if the critical service determiner circuitry 218 determines that the service(s) are within a critical category, then the breach risk determiner circuitry 206 raises the breach risk classification of the service(s) (e.g., medium breach risk to high breach risk).

At block 312, if the critical service determiner circuitry 218 determines that the service(s) are not within a critical category or if the breach risk determiner circuitry 206 raised the breach risk classification of the service(s), then the breach detector circuitry 216 detects if the service(s) have previously experienced one or more security breach occurrences (e.g., password breaches).

At block 314, if the breach detector circuitry 216 detects that the service(s) have previously experienced one or more security breach occurrences, then the breach risk determiner circuitry 206 increases the breach risk classification of the service(s) (e.g., medium breach risk to high breach risk).

At block 316, if the breach detector circuitry 216 detects that the service(s) have not previously experienced one or more security breach occurrences or if the breach risk determiner circuitry 206 raised the breach risk classification of the service(s), then the update interval determiner circuitry 228 determines the interval(s) at which password update suggestion(s) and/or automatic password update(s) are notified to the user based on the breach risk classification of the service(s) and if the user complies with automatic password update mechanism(s) the service(s) offer.

At block 318, the automatic update detector circuitry 226 detects if the service(s) implement automatic update mechanism(s). The automatic update detector circuitry 226 uses the test user account or creates a different test user account to detect if the service(s) provide the option of automatically changing the test user account's password using one or more automatic update mechanisms.

At block 320, if the service(s) do implement automatic update mechanism(s), then the automatic update detector circuitry 226 detects if the user has agreed to allow the password generator circuitry 230 to automatically update the user's password for the service(s) at the expiration of the interval for the service(s).

At block 322, if the service(s) do not implement automatic update mechanism(s) or if the user does not agree to allow the password generator circuitry 230 to automatically update the user's password, then the password generator circuitry 230 generates a pseudo-random password update suggestion for the user for the associated service(s) at the expiration of the interval for the service(s).

At block 324, if the user has agreed to allow the password generator circuitry 230 to automatically update the user's password, then the password generator circuitry 230 generates a pseudo-random password update suggestion and automatically updates the user's password for the user's account associated with the service(s).

At block 326, the update notification circuitry 232 notifies the user operating the user device 104 that the password generator circuitry 230 has generated a password update suggestion, at which point the user can see the updated password and decided whether or not to change the password for the associated service account(s) and the process ends.

At block 328, the update notification circuitry 232 notifies the user operating the user device 104 that the password generator circuitry 230 has automatically updated the password for the associated service account(s) with a pseudo-random password update that the password generator circuitry 230 has generated and the process ends.

Figure 4:
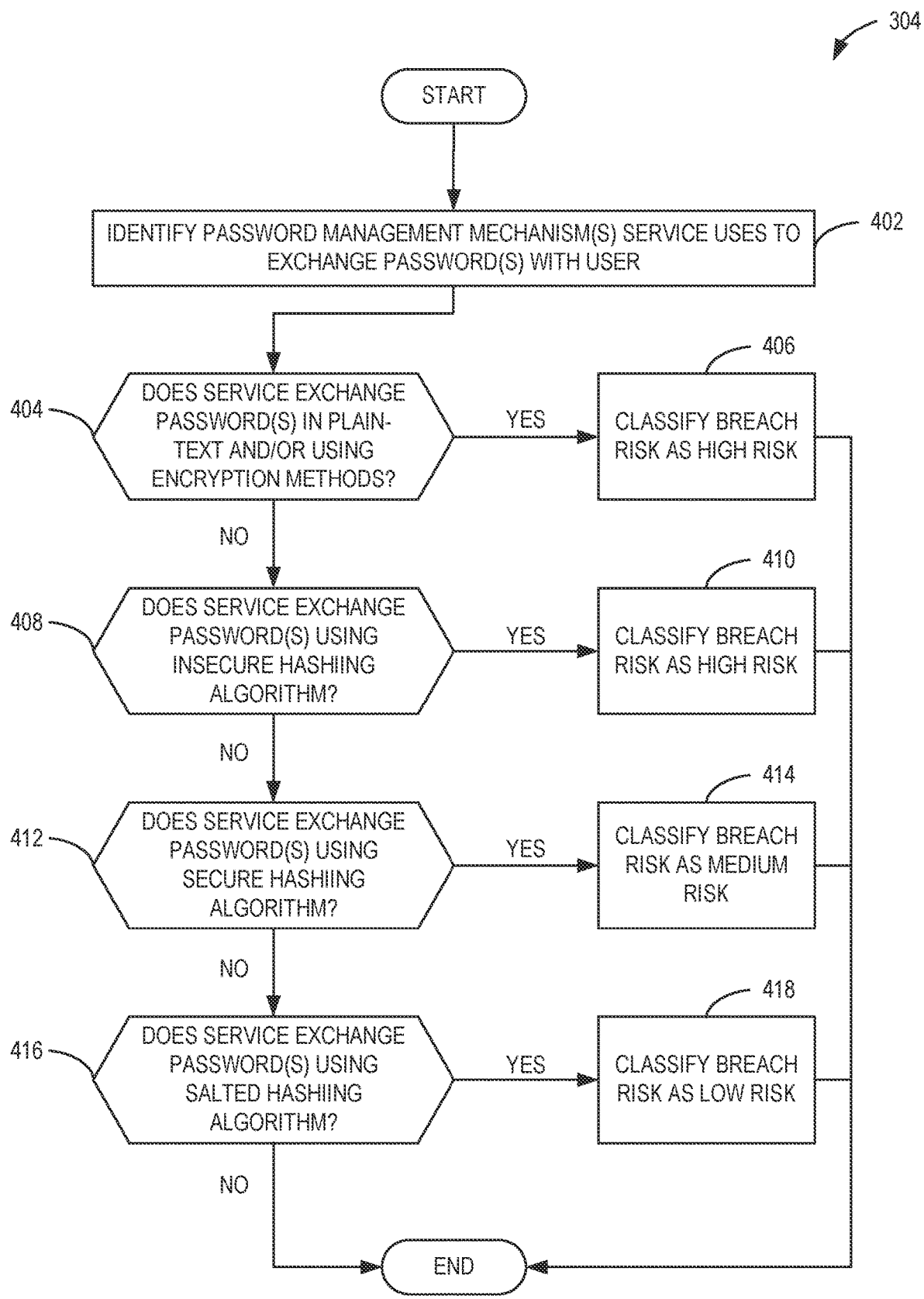
FIG. 4 is a flowchart representative of example machine readable instructions and/or operations that may be executed and/or instantiated by example processor circuitry to implement the security assessor circuitry and the breach risk determiner circuitry of FIG. 2.

FIG. 4 is a flowchart representative of example machine readable instructions and/or example operations 304 that may be executed and/or instantiated by processor circuitry to determine an initial breach risk classification of service(s) in response to detecting the password security mechanism(s) the service(s) use to send, receive, and/or store the user's password(s). The machine readable instructions and/or operations 304 of FIG. 4 begin at block 402, at which the security assessor circuitry 212 identifies the credential management mechanism(s) the service(s) use to send user information (e.g., usernames and/or passwords) from application software operating on a user device 104 to the service(s)' server 102 for storage and/or comparison.

At block 404, the security assessor circuitry 212 assesses if the service(s) exchange user credentials in plain-text or after implementing some encryption method(s) (e.g., URL encoding).

At block 406, if the security assessor circuitry 212 assesses that the service(s) do exchange user credentials in plain-text or after implementing some encryption method(s), then the breach risk determiner circuitry 206 classifies the service(s) as being at a high risk for security breaches and the process ends.

At block 408, if the security assessor circuitry 212 assesses that the service(s) do not exchange user credentials in plain-text or after using some encryption method(s), then the security assessor circuitry 212 assesses if the service(s) exchange user credentials after applying an insecure hashing algorithm (e.g., MD5, SHA-1, etc.) to the user's password and/or username.

At block 410, if the security assessor circuitry 212 assesses that the service(s) do exchange user credentials after applying an insecure hashing algorithm (e.g., MD5, SHA-1, etc.) to the user's password(s), then the breach risk determiner circuitry 206 classifies the service(s) as being at a high risk for security breaches and the process ends.

At block 412, if the security assessor circuitry 212 assesses that the service(s) do not exchange user credentials after applying an insecure hashing algorithm (e.g., MD5, SHA-1, etc.) to the user's password(s), then the security assessor circuitry 212 assesses if the service(s) exchange user credentials after applying a secure hashing algorithm (e.g., SHA-3) to the user's password and/or username.

At block 414, if the service(s) do exchange user credentials after applying a secure hashing algorithm (e.g., SHA-3) to the user's password(s), then the breach risk determiner circuitry 206 classifies the service(s) as being at a medium risk for security breaches and the process ends.

At block 416, if the service(s) do not exchange user credentials after applying a secure hashing algorithm (e.g., SHA-3) to the user's password(s), then the security assessor circuitry 212 assesses if the service(s) exchange user credentials after applying a salted hashing algorithm to the user's password and/or username. If the service(s) do not exchange user credentials after applying a salted hashing algorithm to the user's password and/or username, then the process ends.

At block 418, if the service(s) do exchange user credentials after applying a secure hashing algorithm (e.g., SHA-3) to the user's password(s), then the breach risk determiner circuitry 206 classifies the service(s) as being at a low risk for security breaches and the process ends.

Figure 5:
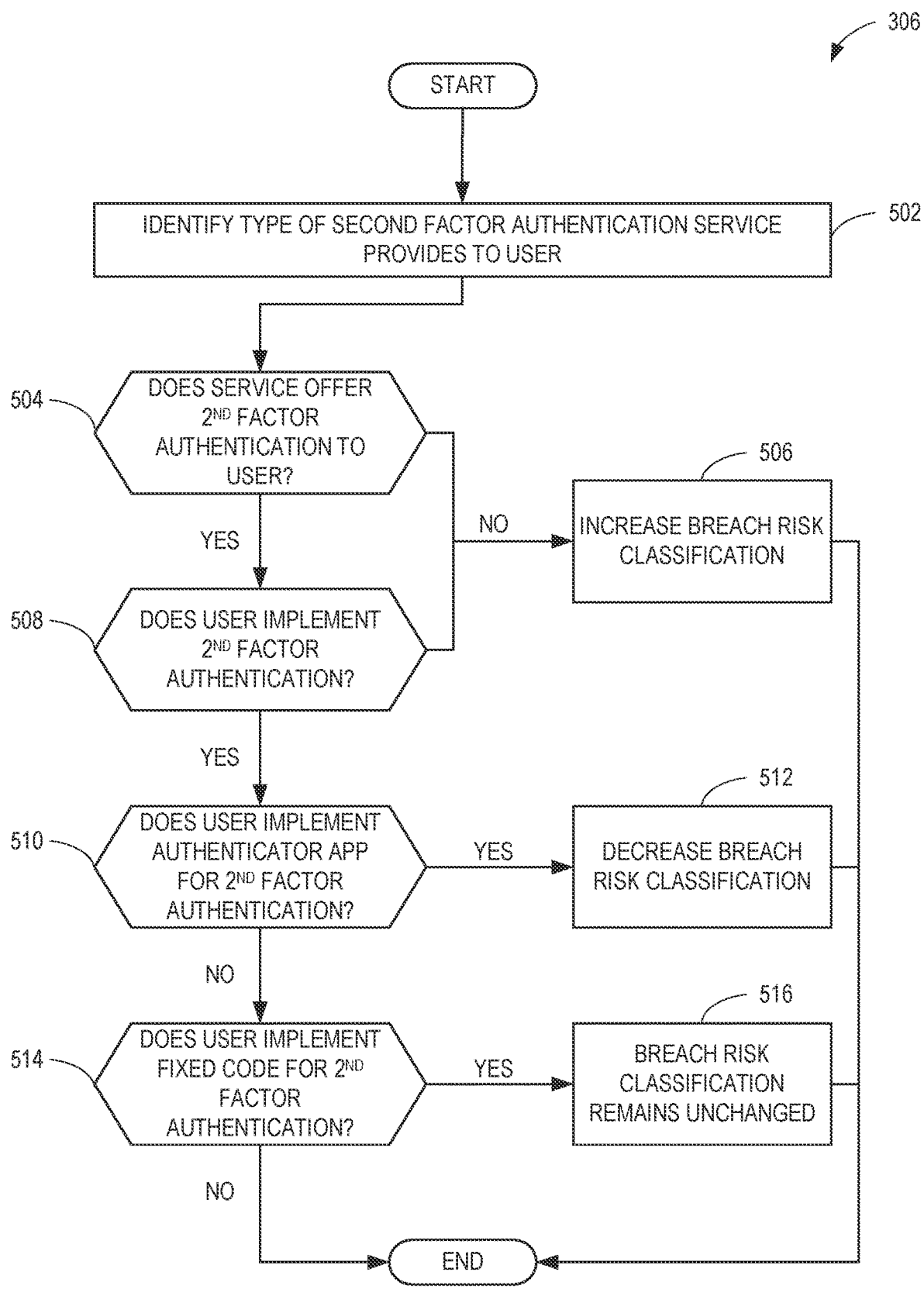
FIG. 5 is a flowchart representative of example machine readable instructions and/or operations that may be executed and/or instantiated by example processor circuitry to implement the authentication identifier circuitry and the breach risk determiner circuitry of FIG. 2.

FIG. 5 is a flowchart representative of example machine readable instructions and/or example operations 306 that may be executed and/or instantiated by processor circuitry to determine an adjusted breach risk classification of the service(s) in response to identifying the second factor authentication mechanism(s) the service(s) use to confirm a user's identity. The machine readable instructions and/or operations 306 of FIG. 5 begin at block 502, at which the authentication identifier circuitry 214 identifies the type of second factor authentication mechanism(s) the service(s) provide to the user.

At block 504, the authentication identifier circuitry 214 identifies if the service(s) offer the user the capability of using second factor authentication mechanism(s) to verify the user's identity when logging into the service(s)' application software.

At block 506, if the service(s) do not offer the capability of using second factor authentication mechanism(s) to the user, then the breach risk determiner circuitry 206 increases the breach risk classification of the service(s) (e.g., medium to high breach risk) and the process ends.

At block 508, if the service(s) does offer the capability of using second factor authentication mechanism(s) to the user, then the authentication identifier circuitry 214 identifies if the user implements one or more second factor authentication mechanisms when logging into the service(s)' application software. If the user does not implement one or more second factor authentication mechanisms when logging into the service(s)' application software, then the breach risk determiner circuitry 206 increases the breach risk classification of the service(s) (e.g., medium to high breach risk) and the process ends.

At block 510, if the user does implement one or more second factor authentication mechanisms when logging into the service(s)' application software, then the authentication identifier circuitry 214 identifies if the user implements an authenticator application (e.g., Google Authenticator, Duo, etc.).

At block 512, if the user does implement an authenticator application, then the breach risk determiner circuitry 206 decreases the breach risk classification of the service(s) (e.g., high to medium breach risk) and the process ends.

At block 514, if the user does not implement an authenticator application, then the authentication identifier circuitry 214 identifies if the user implements a fixed code authentication mechanism (e.g., SMS, Email, etc.). If the user does not implement a fixed code authentication mechanism, then the process ends.

At block 516, if the user does implement a fixed code authentication mechanism, then the breach risk determiner circuitry 206 keeps the service(s)' current breach risk classification the same and the process ends.

Figure 6:
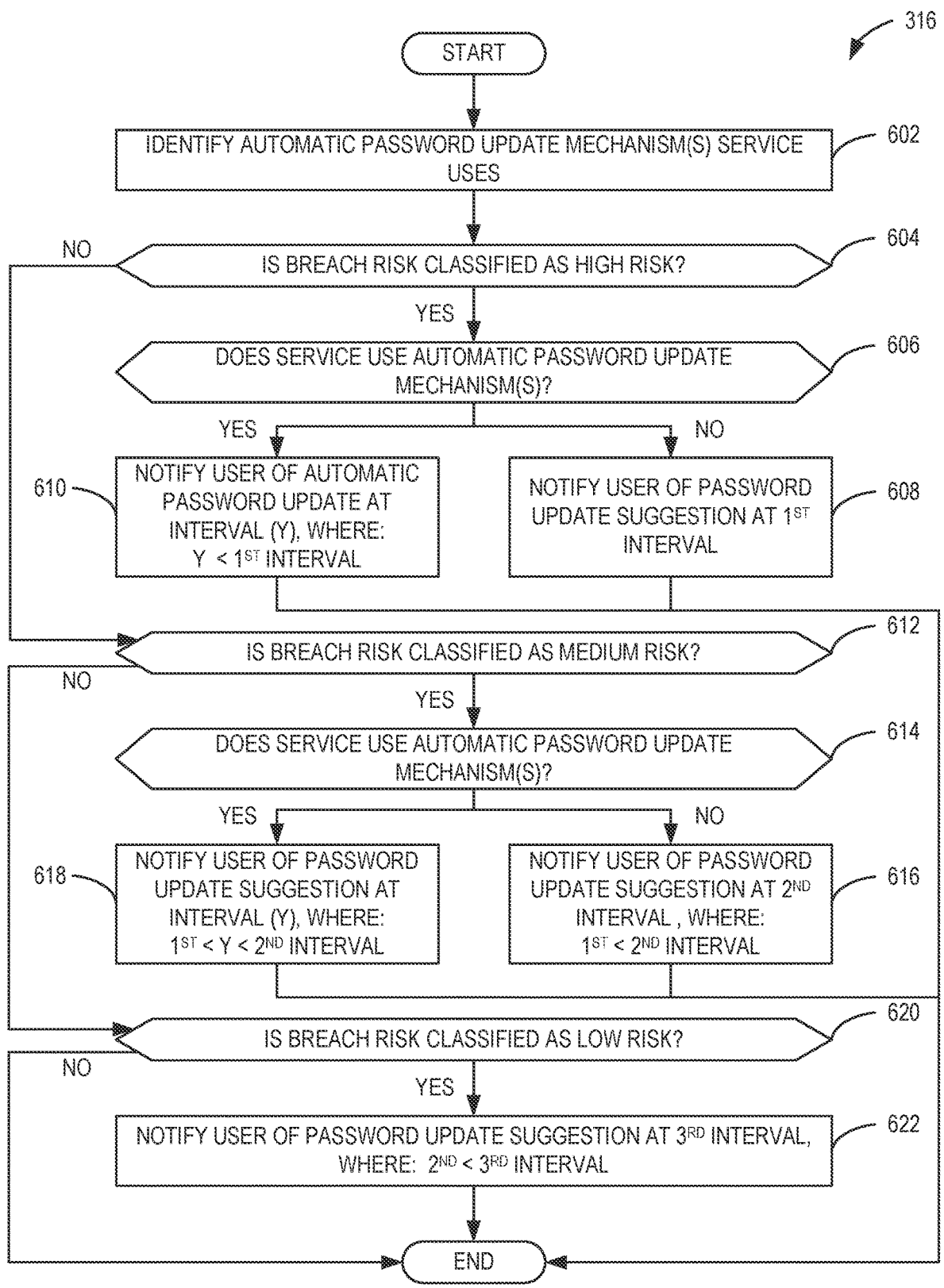
FIG. 6 is a flowchart representative of example machine readable instructions and/or operations that may be executed and/or instantiated by example processor circuitry to implement the automatic update detector circuitry and the update interval determiner circuitry of FIG. 2

FIG. 6 is a flowchart representative of example machine readable instructions and/or example operations 316 that may be executed and/or instantiated by processor circuitry to determine an interval at which to notify the user device 104 of password update suggestion(s) and/or automatic password update(s) based on the breach risk classification of the service(s) and the automatic update mechanism(s) the service provides. The machine readable instructions and/or operations 316 of FIG. 6 begin at block 602, at which the automatic update detector circuitry 226 identifies the type of automatic password update mechanism(s) (e.g., Auto Change, Single Tap Change, etc.) the service provides to the user.

At block 604, the update interval determiner circuitry 228 detects if the service(s) have been determined to have a high breach risk classification by the breach risk determiner circuitry 206.

At block 606, if the update interval determiner circuitry 228 does detect that the service(s) have a high breach risk classification, then the automatic update detector circuitry 226 detects if the service(s) provides automatic password update mechanism(s) to the user. The automatic update detector circuitry 226 uses the test user account created by the security assessor circuitry 212 or creates a different test user account to detect if the service(s) offer the capability of automatic password update mechanism(s).

At block 608, if the service(s) do not provide automatic password update mechanism(s) to the user, then the update interval determiner circuitry 228 determines a first interval (e.g., two weeks) at which to notify the user device 104 of a password update suggestion for the service(s) and the process ends.

At block 610, if the service(s) do provide automatic password update mechanism(s) to the user (and the user complies), then the update interval determiner circuitry 228 determines an interval that is less than the first interval (e.g., one week) at which to notify the user device 104 of an automatic password update and the process ends.

At block 612, if the update interval determiner circuitry 228 does not detect that the service(s) have been determined to have a high breach risk classification by the breach risk determiner circuitry 206, then the update interval determiner circuitry 228 detects if the service(s) have been determined to have a medium breach risk classification by the breach risk determiner circuitry 206.

At block 614, if the update interval determiner circuitry 228 does detect that the service(s) have a medium breach risk classification, then the automatic update detector circuitry 226 detects if the service(s) provides automatic password update mechanism(s) to the user. The automatic update detector circuitry 226 uses the test user account created by the security assessor circuitry 212 or creates a different test user account to detect if the service(s) offer the capability of automatic password update mechanism(s).

At block 616, if the service(s) do not provide automatic password update mechanism(s) to the user, then the update interval determiner circuitry 228 determines a second interval (e.g., eight weeks) at which to notify the user device 104 of a password update suggestion for the service(s) and the process ends.

At block 618, if the service(s) do provide automatic password update mechanism(s) to the user (and the user complies), then the update interval determiner circuitry 228 determines an interval that is less than the second interval but greater than the first interval (e.g., four weeks) at which to notify the user device 104 of an automatic password update and the process ends.

At block 620, if the update interval determiner circuitry 228 does not detect that the service(s) have been determined to have a medium breach risk classification by the breach risk determiner circuitry 206, then the update interval determiner circuitry 228 detects if the service(s) have been determined to have a low breach risk classification by the breach risk determiner circuitry 206. If the update interval determiner circuitry 228 does not detect that the service(s) have been determined to have a low breach risk classification by the breach risk determiner circuitry 206, then the process ends.

At block 622, if the update interval determiner circuitry 228 does detect that the service(s) have a low breach risk classification, then the update interval determiner circuitry 228 determines a third interval that is greater than the second interval (e.g., sixteen weeks) at which to notify the user device 104 of a password update suggestion and/or an automatic password update and the process ends.

FIG. 7 is a block diagram of an example processor platform 700 structured to execute and/or instantiate the machine readable instructions and/or operations of FIGS. 3-6 to implement the dynamic password update circuitry 108 of FIG. 2. The processor platform 700 can be, for example, a server, a personal computer, a workstation, a self-learning machine (e.g., a neural network), a mobile device (e.g., a cell phone, a smart phone, a tablet such as an iPad™), an Internet appliance, or any other type of computing device.

The processor platform 700 of the illustrated example includes processor circuitry 712. The processor circuitry 712 of the illustrated example is hardware. For example, the processor circuitry 712 can be implemented by one or more integrated circuits, logic circuits, FPGAs microprocessors, CPUs, GPUs, DSPs, and/or microcontrollers from any desired family or manufacturer. The processor circuitry 712 may be implemented by one or more semiconductor based (e.g., silicon based) devices. In this example, the processor circuitry 712 implements the example service account identifier circuitry 202, the example security assessor circuitry 212, the example authentication identifier circuitry 214, the example breach detector circuitry 216, the example critical service determiner circuitry 218, the example breach risk determiner circuitry 206, the example automatic update detector circuitry 226, the example update interval determiner circuitry 228, the example password generator circuitry 230, and the example update notification circuitry 232.

The processor circuitry 712 of the illustrated example includes a local memory 713 (e.g., a cache, registers, etc.). The processor circuitry 712 of the illustrated example is in communication with a main memory including a volatile memory 714 and a non-volatile memory 716 by a bus 718. The volatile memory 714 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 716 may be implemented by flash memory and/or any other desired type of memory device. Access to the main memory 714, 716 of the illustrated example is controlled by a memory controller 717.

The processor platform 700 of the illustrated example also includes interface circuitry 720. The interface circuitry 720 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 722 are connected to the interface circuitry 720. The input device(s) 722 permit(s) a user to enter data and/or commands into the processor circuitry 712. The input device(s) 722 can be implemented by, for example, a keyboard, a button, a mouse, a touchscreen, a track-pad, a trackball, an isopoint device, and/or a voice recognition system.

One or more output devices 724 are also connected to the interface circuitry 720 of the illustrated example. The output devices 724 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), and/or a tactile output device. The interface circuitry 720 of the illustrated example, thus, typically includes a graphics driver card, a graphics driver chip, and/or graphics processor circuitry such as a GPU.

The interface circuitry 720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 726. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 700 of the illustrated example also includes one or more mass storage devices 728 to store software and/or data. Examples of such mass storage devices 728 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 732, which may be implemented by the machine readable instructions of FIGS. 3-6, may be stored in the mass storage device 728, in the volatile memory 714, in the non-volatile memory 716, and/or on a removable non-transitory computer readable storage medium such as a CD or DVD.

Figure 8:
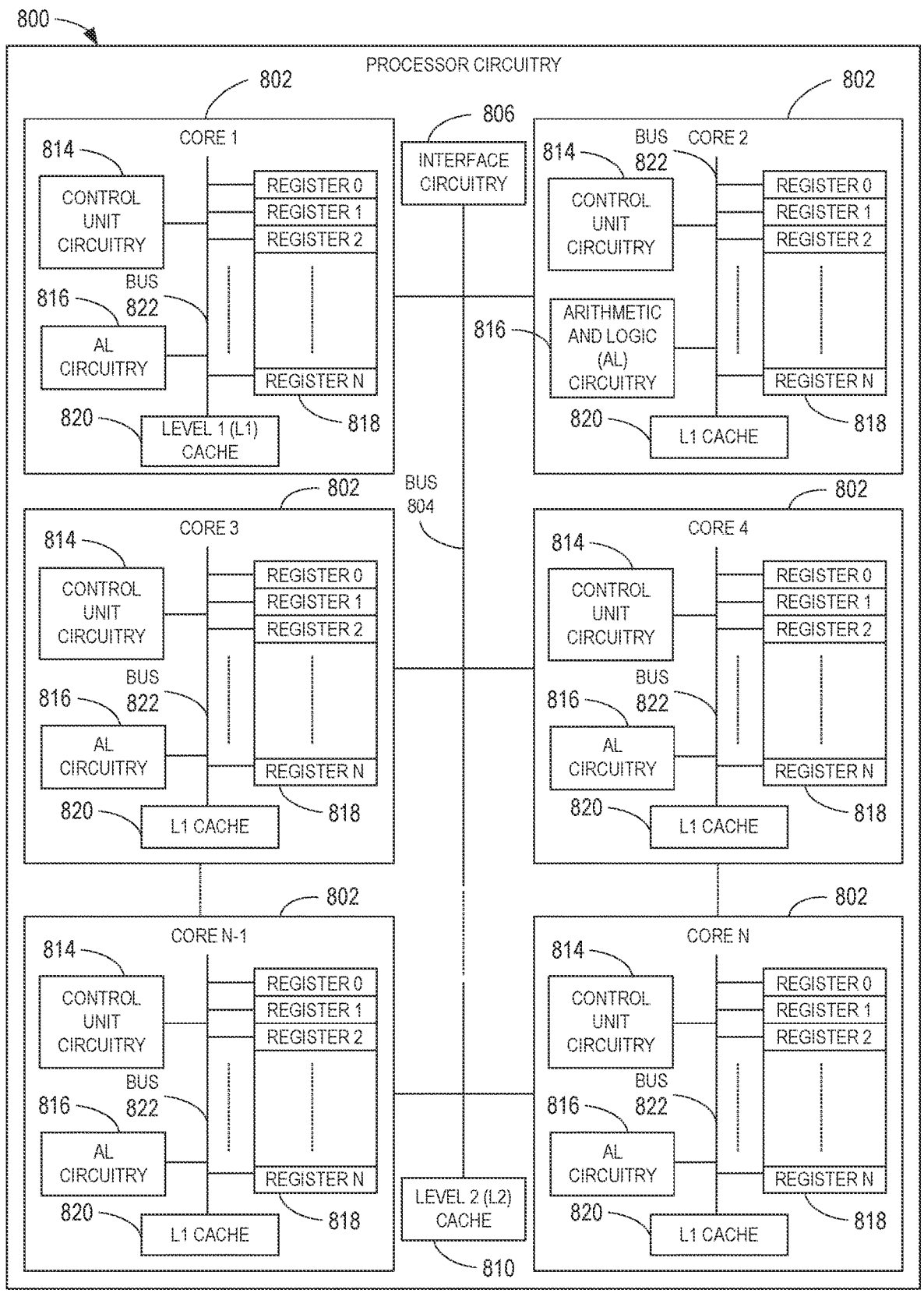
FIG. 8 is a block diagram of an example implementation of the processor circuitry of FIG. 7.

FIG. 8 is a block diagram of an example implementation of the processor circuitry 712 of FIG. 7. In this example, the processor circuitry 712 of FIG. 7 is implemented by a microprocessor 800. For example, the microprocessor 800 may implement multi-core hardware circuitry such as a CPU, a DSP, a GPU, an XPU, etc. Although it may include any number of example cores 802 (e.g., 1 core), the microprocessor 800 of this example is a multi-core semiconductor device including N cores. The cores 802 of the microprocessor 800 may operate independently or may cooperate to execute machine readable instructions. For example, machine code corresponding to a firmware program, an embedded software program, or a software program may be executed by one of the cores 802 or may be executed by multiple ones of the cores 802 at the same or different times. In some examples, the machine code corresponding to the firmware program, the embedded software program, or the software program is split into threads and executed in parallel by two or more of the cores 802. The software program may correspond to a portion or all of the machine readable instructions and/or operations represented by the flowchart of FIG. 8.

The cores 802 may communicate by an example bus 804. In some examples, the bus 804 may implement a communication bus to effectuate communication associated with one(s) of the cores 802. For example, the bus 804 may implement at least one of an Inter-Integrated Circuit (I2C) bus, a Serial Peripheral Interface (SPI) bus, a PCI bus, or a PCIe bus. Additionally or alternatively, the bus 804 may implement any other type of computing or electrical bus. The cores 802 may obtain data, instructions, and/or signals from one or more external devices by example interface circuitry 806. The cores 802 may output data, instructions, and/or signals to the one or more external devices by the interface circuitry 806. Although the cores 802 of this example include example local memory 820 (e.g., Level 1 (L1) cache that may be split into an L1 data cache and an L1 instruction cache), the microprocessor 800 also includes example shared memory 810 that may be shared by the cores (e.g., Level 2 (L2_cache)) for high-speed access to data and/or instructions. Data and/or instructions may be transferred (e.g., shared) by writing to and/or reading from the shared memory 810. The local memory 820 of each of the cores 802 and the shared memory 810 may be part of a hierarchy of storage devices including multiple levels of cache memory and the main memory (e.g., the main memory 714, 716 of FIG. 7). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 802 may be referred to as a CPU, DSP, GPU, etc., or any other type of hardware circuitry. Each core 802 includes control unit circuitry 814, arithmetic and logic (AL) circuitry (sometimes referred to as an ALU) 816, a plurality of registers 818, the L1 cache 820, and an example bus 822. Other structures may be present. For example, each core 802 may include vector unit circuitry, single instruction multiple data (SIMD) unit circuitry, load/store unit (LSU) circuitry, branch/jump unit circuitry, floating-point unit (FPU) circuitry, etc. The control unit circuitry 814 includes semiconductor-based circuits structured to control (e.g., coordinate) data movement within the corresponding core 802. The AL circuitry 816 includes semiconductor-based circuits structured to perform one or more mathematic and/or logic operations on the data within the corresponding core 802. The AL circuitry 816 of some examples performs integer based operations. In other examples, the AL circuitry 816 also performs floating point operations. In yet other examples, the AL circuitry 816 may include first AL circuitry that performs integer based operations and second AL circuitry that performs floating point operations. In some examples, the AL circuitry 816 may be referred to as an Arithmetic Logic Unit (ALU). The registers 818 are semiconductor-based structures to store data and/or instructions such as results of one or more of the operations performed by the AL circuitry 816 of the corresponding core 802. For example, the registers 818 may include vector register(s), SIMD register(s), general purpose register(s), flag register(s), segment register(s), machine specific register(s), instruction pointer register(s), control register(s), debug register(s), memory management register(s), machine check register(s), etc. The registers 818 may be arranged in a bank as shown in FIG. 8. Alternatively, the registers 818 may be organized in any other arrangement, format, or structure including distributed throughout the core 802 to shorten access time. The bus 820 may implement at least one of an I2C bus, a SPI bus, a PCI bus, or a PCIe bus Each core 802 and/or, more generally, the microprocessor 800 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 800 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 9:
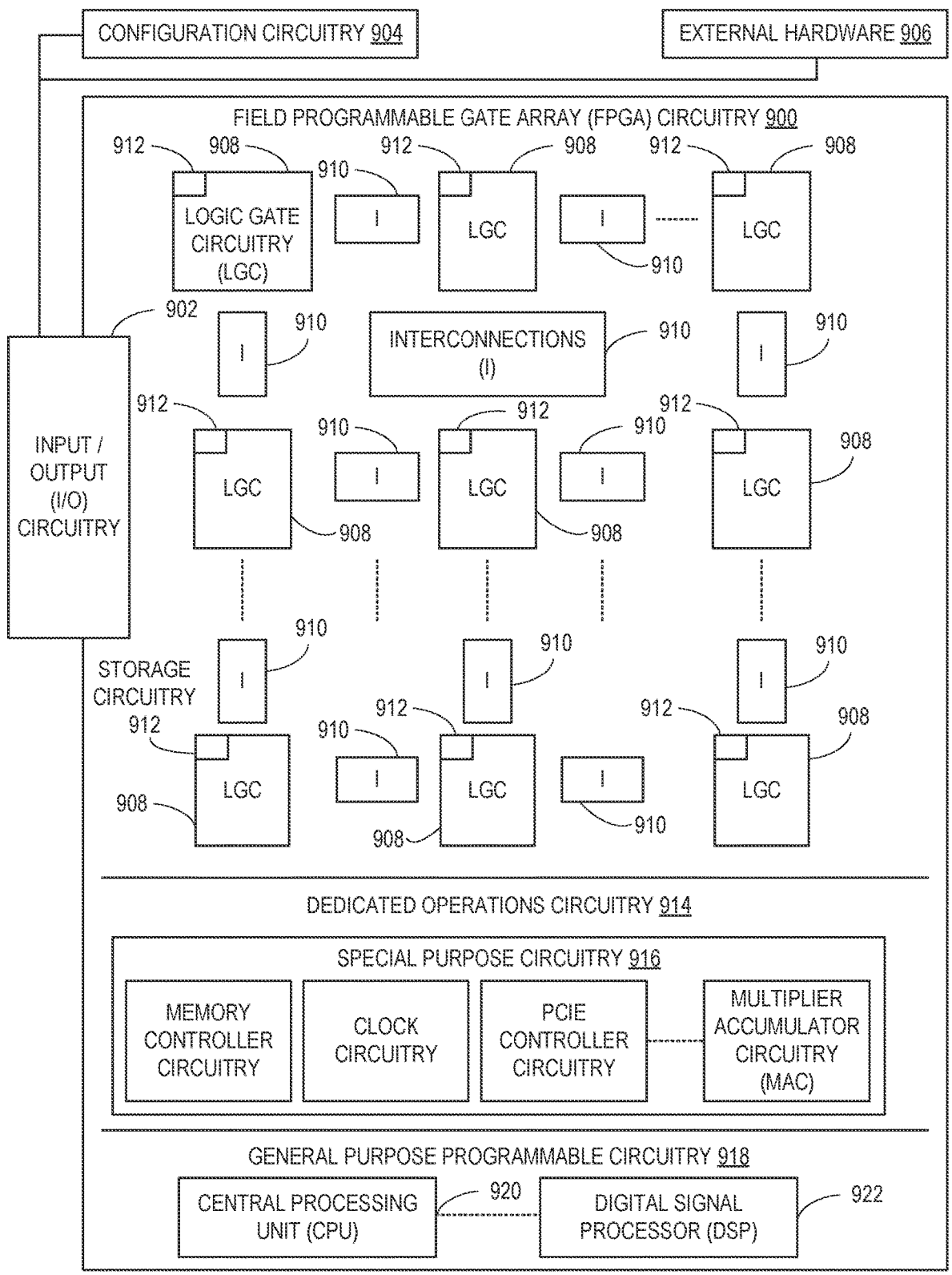
FIG. 9 is a block diagram of another example implementation of the processor circuitry of FIG. 7.

FIG. 9 is a block diagram of another example implementation of the processor circuitry 712 of FIG. 7. In this example, the processor circuitry 712 is implemented by FPGA circuitry 900. The FPGA circuitry 900 can be used, for example, to perform operations that could otherwise be performed by the example microprocessor 800 of FIG. 8 executing corresponding machine readable instructions. However, once configured, the FPGA circuitry 900 instantiates the machine readable instructions in hardware and, thus, can often execute the operations faster than they could be performed by a general purpose microprocessor executing the corresponding software.

More specifically, in contrast to the microprocessor 800 of FIG. 8 described above (which is a general purpose device that may be programmed to execute some or all of the machine readable instructions represented by the flowchart of FIGS. 3-6 but whose interconnections and logic circuitry are fixed once fabricated), the FPGA circuitry 900 of the example of FIG. 9 includes interconnections and logic circuitry that may be configured and/or interconnected in different ways after fabrication to instantiate, for example, some or all of the machine readable instructions represented by the flowchart of FIGS. 3-6. In particular, the FPGA 900 may be thought of as an array of logic gates, interconnections, and switches. The switches can be programmed to change how the logic gates are interconnected by the interconnections, effectively forming one or more dedicated logic circuits (unless and until the FPGA circuitry 900 is reprogrammed). The configured logic circuits enable the logic gates to cooperate in different ways to perform different operations on data received by input circuitry. Those operations may correspond to some or all of the software represented by the flowchart of FIGS. 3-6. As such, the FPGA circuitry 900 may be structured to effectively instantiate some or all of the machine readable instructions of the flowchart of FIGS. 3-6 as dedicated logic circuits to perform the operations corresponding to those software instructions in a dedicated manner analogous to an ASIC. Therefore, the FPGA circuitry 900 may perform the operations corresponding to the some or all of the machine readable instructions of FIGS. 3-6 faster than the general purpose microprocessor can execute the same.

In the example of FIG. 9, the FPGA circuitry 900 is structured to be programmed (and/or reprogrammed one or more times) by an end user by a hardware description language (HDL) such as Verilog. The FPGA circuitry 900 of FIG. 9, includes example input/output (I/O) circuitry 902 to obtain and/or output data to/from example configuration circuitry 904 and/or external hardware (e.g., external hardware circuitry) 906. For example, the configuration circuitry 904 may implement interface circuitry that may obtain machine readable instructions to configure the FPGA circuitry 900, or portion(s) thereof. In some such examples, the configuration circuitry 904 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 906 may implement the microprocessor 800 of FIG. 8. The FPGA circuitry 900 also includes an array of example logic gate circuitry 908, a plurality of example configurable interconnections 910, and example storage circuitry 912. The logic gate circuitry 908 and interconnections 910 are configurable to instantiate one or more operations that may correspond to at least some of the machine readable instructions of FIGS. 3-6 and/or other desired operations. The logic gate circuitry 908 shown in FIG. 9 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 908 to enable configuration of the electrical structures and/or the logic gates to form circuits to perform desired operations. The logic gate circuitry 908 may include other electrical structures such as look-up tables (LUTs), registers (e.g., flip-flops or latches), multiplexers, etc.

The interconnections 910 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 908 to program desired logic circuits.

The storage circuitry 912 of the illustrated example is structured to store result(s) of the one or more of the operations performed by corresponding logic gates. The storage circuitry 912 may be implemented by registers or the like. In the illustrated example, the storage circuitry 912 is distributed amongst the logic gate circuitry 908 to facilitate access and increase execution speed.

The example FPGA circuitry 900 of FIG. 9 also includes example Dedicated Operations Circuitry 914. In this example, the Dedicated Operations Circuitry 914 includes special purpose circuitry 916 that may be invoked to implement commonly used functions to avoid the need to program those functions in the field. Examples of such special purpose circuitry 916 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 900 may also include example general purpose programmable circuitry 918 such as an example CPU 920 and/or an example DSP 922. Other general purpose programmable circuitry 918 may additionally or alternatively be present such as a GPU, an XPU, etc., that can be programmed to perform other operations.

Although FIGS. 8 and 9 illustrate two example implementations of the processor circuitry 712 of FIG. 7, many other approaches are contemplated. For example, as mentioned above, modern FPGA circuitry may include an on-board CPU, such as one or more of the example CPU 920 of FIG. 9. Therefore, the processor circuitry 712 of FIG. 7 may additionally be implemented by combining the example microprocessor 800 of FIG. 8 and the example FPGA circuitry 900 of FIG. 9. In some such hybrid examples, a first portion of the machine readable instructions represented by the flowchart of FIGS. 3-6 may be executed by one or more of the cores 802 of FIG. 8 and a second portion of the machine readable instructions represented by the flowchart of FIGS. 3-6 may be executed by the FPGA circuitry 900 of FIG. 9.

In some examples, the processor circuitry 712 of FIG. 7 may be in one or more packages. For example, the processor circuitry 800 of FIG. 8 and/or the FPGA circuitry 800 of FIG. 8 may be in one or more packages. In some examples, an XPU may be implemented by the processor circuitry 712 of FIG. 7, which may be in one or more packages. For example, the XPU may include a CPU in one package, a DSP in another package, a GPU in yet another package, and an FPGA in still yet another package.

Figure 10:
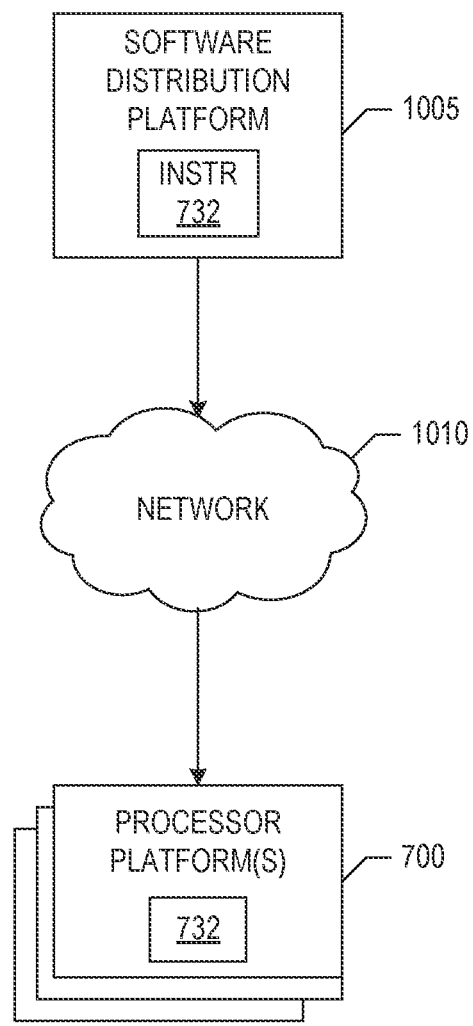
FIG. 10 is a block diagram of an example software distribution platform (e.g., one or more servers) to distribute software (e.g., software corresponding to the example machine readable instructions of FIGS. 3-6) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1005 to distribute software such as the example machine readable instructions 732 of FIG. 7 to hardware devices owned and/or operated by third parties is illustrated in FIG. 10. The example software distribution platform 1005 may be implemented by any computer server, data facility, cloud service, etc., capable of storing and transmitting software to other computing devices. The third parties may be customers of the entity owning and/or operating the software distribution platform 1005. For example, the entity that owns and/or operates the software distribution platform 1005 may be a developer, a seller, and/or a licensor of software such as the example machine readable instructions 732 of FIG. 7. The third parties may be consumers, users, retailers, OEMs, etc., who purchase and/or license the software for use and/or re-sale and/or sub-licensing. In the illustrated example, the software distribution platform 1005 includes one or more servers and one or more storage devices. The storage devices store the machine readable instructions 732, which may correspond to the example machine readable instructions represented by the flowcharts of FIGS. 3-6, as described above. The one or more servers of the example software distribution platform 1005 are in communication with a network 1010, which may correspond to any one or more of the Internet and/or any of the example networks 1010 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 732 from the software distribution platform 1005. For example, the software, which may correspond to the example machine readable instructions 732 of FIG. 7, may be downloaded to the example processor platform 700, which is to execute the machine readable instructions 732 to implement the dynamic password update circuitry 108. In some examples, one or more servers of the software distribution platform 1005 periodically offer, transmit, and/or force updates to the software (e.g., the example machine readable instructions 732 of FIG. 7) to ensure improvements, patches, updates, etc., are distributed and applied to the software at the end user devices.

From the foregoing, it will be appreciated that example systems, methods, apparatus, and articles of manufacture have been disclosed that determine a breach risk classification of one or more organizations with which a user has an account and that the user interacts with via application software. The example systems, methods, apparatus, and articles of manufacture have been disclosed that dynamically determine a recurring interval at which to notify the user of a password update suggestion and/or an automatic password update based on the breach risk classification of the organization and whether the user chooses to implement an automatic password update functionality offered by the organization. The disclosed systems, methods, apparatus, and articles of manufacture improve the efficiency of using a computing device by dynamically determining a recurring interval at which to notify the user of a password update suggestion and/or an automatic password update based on the breach risk classification of the organization and whether the user chooses to implement an automatic password update functionality offered by the organization. The disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to dynamically determine a recurring interval at which to notify a user of a password update suggestion and/or an automatic password update based on the breach risk classification of the organization and an automatic password update function the user has chosen are disclosed herein. Further examples and combinations thereof include the following:

Example 1 includes At least one non-transitory computer-readable medium comprising instructions that, when executed, allow processor circuitry to at least determine a dynamic password update notification interval based on a breach risk classification and an automatic password update mechanism of a service with which a user has an account, and generate a password update suggestion for the user at the dynamic password update notification interval determined by the processor circuitry.

Example 2 includes the at least one non-transitory computer-readable medium of example 1, wherein the instructions are to determine the breach risk classification based on operations executed in a sandbox environment to identify one or more credential management mechanisms the service uses to exchange at least a username or a password with the user, identify a second factor authentication mechanism the user implements, determine if the service is within a critical category based on a Global Threat Intelligence (GTI) category in which the service is classified, and identify one or more breach occurrences the service has experienced.

Example 3 includes the at least one non-transitory computer-readable medium of example 2, wherein the instructions are to identify one or more credential management mechanisms including at least one of plain-text, encryption, hashing algorithm, or salted hashing algorithm.

Example 4 includes the at least one non-transitory computer-readable medium of example 2, wherein the instructions are to identify the second factor authentication mechanism including at least one of a fixed code authentication or an authenticator application.

Example 5 includes the at least one non-transitory computer-readable medium of example 1, wherein the instructions are to identify the service with which the user has the account based on telemetry data.

Example 6 includes the at least one non-transitory computer-readable medium of example 1, wherein the instructions are to determine the breach risk classification as being at least one of high risk, medium risk, or low risk.

Example 7 includes the at least one non-transitory computer-readable medium of example 1, wherein the instructions are to determine one or more dynamic update intervals at which to generate the password update suggestion based on the breach risk classification, the intervals including at least one of a first interval associated with high breach risk, a second interval associated with medium breach risk, wherein the second interval is greater than the first interval, and a third interval associated with low breach risk, wherein the third interval is greater than the second interval.

Example 8 includes the at least one non-transitory computer-readable medium of example 7, wherein the instructions are to adjust one or more intervals at which to generate the password update suggestion based on detecting the automatic update mechanism of the service.

Example 9 includes the at least one non-transitory computer-readable medium of example 1, wherein the instructions are to generate the password update suggestion to the user wherein the password is unique for the service with which the user has the account.

Example 10 includes the at least one non-transitory computer-readable medium of example 1, wherein the instructions are to generate the password update suggestion in response to the dynamic password update interval ending.

Example 11 includes an apparatus to generate a dynamic password update notification comprising processor circuitry including one or more of at least one of a central processing unit, a graphic processing unit or a digital signal processor, the at least one of the central processing unit, the graphics processing unit or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or Application Specific Integrated Circuitry (ASIC) including logic gate circuitry to perform one or more third operations, the processor circuitry to perform at least one of the first operations, the second operations or the third operations to instantiate update interval determiner circuitry to determine a dynamic password update notification interval based on a breach risk classification and an automatic password update mechanism of a service with which a user has an account, and password generator circuitry to generate a password update suggestion for the user at the dynamic password update notification interval determined by the processor circuitry.

Example 12 includes the apparatus of example 11, wherein the processor circuitry is to determine the breach risk classification based on operations executed in a sandbox environment to identify one or more credential management mechanisms the service uses to exchange at least a username or a password with the user, identify a second factor authentication mechanism the user implements, determine if the service is within a critical category based on a Global Threat Intelligence (GTI) category in which the service is classified, and identify one or more breach occurrences the service has experienced.

Example 13 includes the apparatus of example 12, wherein the processor circuitry is to identify one or more credential management mechanisms including at least one of plain-text, encryption, hashing algorithm, or salted hashing algorithm.

Example 14 includes the apparatus of example 12, wherein the processor circuitry is to identify the second factor authentication mechanism including at least one of a fixed code authentication or an authenticator application.

Example 15 includes the apparatus of example 11, wherein the processor circuitry is to identify the service with which the user has the account based on telemetry data.

Example 16 includes the apparatus of example 11, wherein the processor circuitry is to determine the breach risk classification as being at least one of high risk, medium risk, or low risk.

Example 17 includes the apparatus of example 11, wherein the processor circuitry is to determine one or more dynamic update intervals at which to generate the password update suggestion based on the breach risk classification, the intervals including at least one of a first interval associated with high breach risk, a second interval associated with medium breach risk, wherein the second interval is greater than the first interval, and a third interval associated with low breach risk, wherein the third interval is greater than the second interval.

Example 18 includes the apparatus of example 17, wherein the processor circuitry is to adjust one or more intervals at which to generate the password update suggestion based on detecting the automatic update mechanism of the service.

Example 19 includes the apparatus of example 11, wherein the processor circuitry is to generate the password update suggestion to the user wherein the password is unique for the service with which the user has one or more accounts.

Example 20 includes the apparatus of example 11, wherein the processor circuitry is to generate the password update suggestion in response to the dynamic password update interval ending.

Example 21 includes an apparatus comprising means for determining a dynamic password update notification interval based on a breach risk classification and an automatic password update setting of an online service, and means for generating a password update suggestion at the dynamic password update notification interval.

Example 22 includes the apparatus of example 21, wherein the means for determining is to determine the breach risk classification based on means for identifying one or more credential management techniques the online service uses to exchange at least a username or a password with the user, wherein the means for identifying is to identify a second factor authentication mechanism the user implements, wherein the means for identifying is to identify one or more security breaches the service has experienced, and means for determining if the service is within a critical category based on a Global Threat Intelligence (GTI) category in which the service is classified.

Example 23 includes the apparatus of example 22, wherein the means for identifying is to identify one or more credential management techniques including at least one of plain-text, encryption, hashing algorithm, or salted hashing algorithm.

Example 24 includes the apparatus of example 22, wherein the means for identifying is to identify the second factor authentication mechanism including at least one of a fixed code authentication or an authenticator application.

Example 25 includes the apparatus of example 21, wherein the means for determining is to determine the service with which a user has an account based on telemetry data.

Example 26 includes the apparatus of example 21, wherein the means for determining is to determine the breach risk classification as being at least one of high risk, medium risk, or low risk.

Example 27 includes the apparatus of example 21, wherein the means for determining is to determine one or more dynamic update intervals at which to generate the password update suggestion based on the breach risk classification, including means for determining a first interval associated with high breach risk, wherein the means for determining is to determine a second interval associated with medium breach risk, the second interval being greater than the first interval, wherein the means for determining is to determine a third interval associated with low breach risk, the third interval being greater than the second interval.

Example 28 includes the apparatus of example 27, wherein the means for determining is to alter one or more intervals at which to generate the password update suggestion based on detecting the automatic update setting of the service.

Example 29 includes the apparatus of example 21, wherein the means for generating is to generate the password update suggestion to a user that is unique for the service with which a user has one or more accounts.

Example 30 includes the apparatus of example 21, wherein the means for generating is to generate the password update suggestion in response to ending the dynamic password update interval.

Example 31 includes a method comprising determining a dynamic password update notification interval based on a breach risk classification and an automatic password update mechanism of an service with which a user has an account, and generating a password update suggestion for the user at the dynamic password update notification interval determined by processor circuitry.

Example 32 includes the method of example 31, including determining the breach risk classification based on operations executed in a sandbox environment, including identifying one or more credential management mechanisms the service uses to exchange at least a username or a password with the user, identifying a second factor authentication mechanism the user implements, determining if the service is within a critical category based on a Global Threat Intelligence (GTI) category in which the service is classified, and identifying one or more breach occurrences the service has experienced.

Example 33 includes the method of example 32, including identifying one or more credential management mechanisms including at least one of plain-text, encryption, hashing algorithm, or salted hashing algorithm.

Example 34 includes the method of example 32, including identifying the second factor authentication mechanism including at least one of a fixed code authentication or an authenticator application.

Example 35 includes the method of example 31, identifying the service with which the user has the account based on telemetry data.

Example 36 includes the method of example 31, including determining the breach risk classification as being at least one of high risk, medium risk, or low risk.

Example 37 includes the method of example 31, including determining one or more dynamic update intervals at which to generate the password update suggestion based on the breach risk classification, including determining a first interval associated with high breach risk, determining a second interval associated with medium breach risk, wherein the second interval is greater than the first interval, and determining a third interval associated with low breach risk, wherein the third interval is greater than the second interval.

Example 38 includes the method of example 37, including adjusting one or more intervals at which to generate the password update suggestion based on detecting the automatic update mechanism of the service.

Example 39 includes the method of example 31, including generating password update suggestions to the user wherein the password is unique for the service with which the user has the account.

Example 40 includes the method of example 31, including generating the password update suggestion in response to the dynamic password update interval ending.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. At least one non-transitory computer-readable medium comprising instructions that, when executed by processor circuitry, allow the processor circuitry to at least:
   create a sample user account with a service with which a user has an account to obtain security measures that the service uses when transmitting user login information;
   determine a dynamic password update notification interval based on a breach risk classification of the service, the breach risk classification at least partially based on the security measures, the dynamic password update notification interval to be a first interval when the breach risk classification of the service is a first breach risk classification, the dynamic password update notification interval to be a second interval when the breach risk classification of the service is a second breach risk classification;
   modify the dynamic password update notification interval after a change of the breach risk classification is detected;
   cause display of a password update notification for the user based on an expiration of the dynamic password update notification interval; and
   modify a stored indication of the expiration of the dynamic password update notification interval after a change to a password associated with the account is detected.

2. The at least one non-transitory computer-readable medium of claim 1, wherein the instructions further allow the processor circuitry to determine the breach risk classification based on operations executed in a sandbox environment to:
   identify one or more credential management mechanisms the service uses to exchange at least a username or a password with the user;
   identify a second factor authentication mechanism the user implements;
   determine if the service is within a critical category based on a Global Threat Intelligence (GTI) category in which the service is classified; and
   identify one or more breach occurrences the service has experienced.

3. The at least one non-transitory computer-readable medium of claim 2, wherein the instructions further allow the processor circuitry to:
   identify one or more credential management mechanisms including at least one of plain-text, encryption, hashing algorithm, or salted hashing algorithm; and
   identify the second factor authentication mechanism including at least one of a fixed code authentication or an authenticator application.

4. The at least one non-transitory computer-readable medium of claim 1, wherein the instructions further allow the processor circuitry to identify the service with which the user has the account based on telemetry data.

5. The at least one non-transitory computer-readable medium of claim 1, wherein the instructions further allow the processor circuitry to determine one or more dynamic update intervals at which to generate the password update notification based on the breach risk classification, the intervals including at least one of:
   a first interval associated with high breach risk;
   a second interval associated with medium breach risk, wherein the second interval is greater than the first interval; and
   a third interval associated with low breach risk, wherein the third interval is greater than the second interval.

6. The at least one non-transitory computer-readable medium of claim 5, wherein the instructions further allow the processor circuitry to adjust one or more intervals at which to generate the password update notification based on detecting an automatic password update mechanism of the service.

7. The at least one non-transitory computer-readable medium of claim 1, wherein the instructions further allow the processor circuitry to generate the password update notification in response to encountering the expiration of the dynamic password update interval.

8. An apparatus to generate a dynamic password update notification comprising:
interface circuitry;
machine readable instructions; and
processor circuitry to at least one of instantiate or execute the machine readable instructions to:
create a sample user account with a service with which a user has an account to obtain security measures that the service uses when transmitting user login information;
determine a dynamic password update notification interval based on a breach risk classification of the service, the breach risk classification at least partially based on the security measures, the dynamic password update notification interval to be a first interval when the breach risk classification of the service is a first breach risk classification, the dynamic password update notification interval to be a second interval when the breach risk classification of the service is a second breach risk classification;
modify the dynamic password update notification interval after a change of the breach risk classification is detected;
cause display of a password update notification for the user based on an expiration of the dynamic password update notification interval; and
modify a stored indication of the expiration of the dynamic password update notification interval after a change to a password associated with the account is detected.

9. The apparatus of claim 8, wherein the processor circuitry at least one of instantiate or execute the machine readable instructions to determine the breach risk classification based on operations executed in a sandbox environment to:
identify one or more credential management mechanisms the service uses to exchange at least a username or a password with the user;
identify a second factor authentication mechanism the user implements;
determine if the service is within a critical category based on a Global Threat Intelligence (GTI) category in which the service is classified; and
identify one or more breach occurrences the service has experienced.

10. The apparatus of claim 9, wherein the processor circuitry at least one of instantiate or execute the machine readable instructions to:
identify one or more credential management mechanisms including at least one of plain-text, encryption, hashing algorithm, or salted hashing algorithm; and
identify the second factor authentication mechanism including at least one of a fixed code authentication or an authenticator application.

11. The apparatus of claim 8, wherein the processor circuitry at least one of instantiate or execute the machine readable instructions to identify the service with which the user has the account based on telemetry data.

12. The apparatus of claim 8, wherein the processor circuitry at least one of instantiate or execute the machine readable instructions to determine one or more dynamic update intervals at which to generate the password update notification based on the breach risk classification, the intervals including at least one of:
a first interval associated with high breach risk;
a second interval associated with medium breach risk, wherein the second interval is greater than the first interval; and
a third interval associated with low breach risk, wherein the third interval is greater than the second interval.

13. The apparatus of claim 12, wherein the processor circuitry at least one of instantiate or execute the machine readable instructions to adjust one or more intervals at which to generate the password update notification based on detecting an automatic password update mechanism of the service.

14. The apparatus of claim 8, wherein the processor circuitry at least one of instantiate or execute the machine readable instructions to generate the password update notification in response to encountering the expiration of the dynamic password update interval.

15. A method comprising:
creating a sample user account with a service with which a user has an account to obtain security measures that the service uses when transmitting user login information;
determining a dynamic password update notification interval based on a breach risk classification of the service, the breach risk classification at least partially based on the security measures, the dynamic password update notification interval to be a first interval when the breach risk classification of the service is a first breach risk classification, the dynamic password update notification interval to be a second interval when the breach risk classification of the service is a second breach risk classification;
modify the dynamic password update notification interval after a change of the breach risk classification is detected;
causing display of a password update notification for the user based on an expiration of the dynamic password update notification interval; and
modifying a stored indication of the expiration of the dynamic password update notification interval after a change to a password associated with the account is detected.

16. The method of claim 15, including determining the breach risk classification based on operations executed in a sandbox environment, including:
identifying one or more credential management mechanisms the service uses to exchange at least a username or a password with the user;
identifying a second factor authentication mechanism the user implements;
determining if the service is within a critical category based on a Global Threat Intelligence (GTI) category in which the service is classified; and
identifying one or more breach occurrences the service has experienced.

17. The method of claim 16, including:
identifying one or more credential management mechanisms including at least one of plain-text, encryption, hashing algorithm, or salted hashing algorithm; and
identifying the second factor authentication mechanism including at least one of a fixed code authentication or an authenticator application.

18. The method of claim 15, including determining one or more dynamic update intervals at which to generate the password update notification based on the breach risk classification, including:
determining a first interval associated with high breach risk;

determining a second interval associated with medium breach risk, wherein the second interval is greater than the first interval; and determining a third interval associated with low breach risk, wherein the third interval is greater than the second interval.

19. The method of claim 18, including adjusting one or more intervals at which to generate the password update notification based on detecting an automatic password update mechanism of the service.

20. The method of claim 15, including generating the password update notification in response to encountering the expiration of the dynamic password update interval.

* * * * *

UNITED STATES PATENT AND TRADEMARK OFFICE
CERTIFICATE OF CORRECTION

| | | |
|---|---|---|
| PATENT NO. | : 12,118,074 B2 | Page 1 of 1 |
| APPLICATION NO. | : 17/539167 | |
| DATED | : October 15, 2024 | |
| INVENTOR(S) | : Konda et al. | |

It is certified that error appears in the above-identified patent and that said Letters Patent is hereby corrected as shown below:

In the Drawings

Figure 4, Field 408, Delete "HASHIING" and Insert --HASHING--.

Figure 4, Field 412, Delete "HASHIING" and Insert --HASHING--.

Figure 4, Field 416, Delete "HASHIING" and Insert --HASHING--.

Signed and Sealed this
Twenty-fourth Day of December, 2024

Derrick Brent
*Acting Director of the United States Patent and Trademark Office*